(12) United States Patent
Kato

(10) Patent No.: US 9,319,229 B2
(45) Date of Patent: Apr. 19, 2016

(54) TRANSMISSION TERMINAL AND METHOD OF TRANSMITTING DISPLAY DATA

(75) Inventor: Yoshinaga Kato, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 456 days.

(21) Appl. No.: 13/227,742

(22) Filed: Sep. 8, 2011

(65) Prior Publication Data

US 2012/0069132 A1 Mar. 22, 2012

(30) Foreign Application Priority Data

Sep. 16, 2010 (JP) .................. 2010-208130
Jul. 15, 2011 (JP) .................. 2011-157166

(51) Int. Cl.
*H04M 3/56* (2006.01)
*H04L 12/18* (2006.01)
*H04W 4/00* (2009.01)

(52) U.S. Cl.
CPC ........... *H04L 12/1827* (2013.01); *H04M 3/567* (2013.01); *H04W 4/008* (2013.01)

(58) Field of Classification Search
USPC ................. 379/14.02; 455/558, 519
See application file for complete search history.

(56) References Cited

U.S. PATENT DOCUMENTS

| 7,920,159 B2* | 4/2011 | Ueno .................. H04N 7/15 348/14.08 |
| 8,032,182 B2* | 10/2011 | Bennett .................. 455/558 |
| 2006/0040692 A1* | 2/2006 | Anttila .................. H04M 3/56 455/519 |
| 2007/0069888 A1* | 3/2007 | Parameswar ............. 340/539.13 |

FOREIGN PATENT DOCUMENTS

| JP | 11-17677 | 1/1999 |
| JP | 2003-244289 | 8/2003 |
| JP | 2006-18430 | 1/2006 |
| JP | 2009-37566 | 2/2009 |
| JP | 2010-241114 | 10/2010 |

OTHER PUBLICATIONS

Office Action mailed Jun. 2, 2015, in Japanese Patent Application No. 2011-157166.

* cited by examiner

*Primary Examiner* — Amal Zenati
(74) *Attorney, Agent, or Firm* — Oblon, McClelland, Maier & Neustadt, L.L.P.

(57) ABSTRACT

A transmission terminal includes a network communication unit to transceive predetermined data with another transmission terminal connected to a communication network; a proximity communication unit to establish a proximity communication with an information providing apparatus that displays a predetermined image and to transmit connection setting information required to establish a communication at a longer range; a short-range communication unit to establish a radio communication with the information providing apparatus at a longer range than the proximity communication unit using the connection setting information; a display data receiving unit to receive display data through a communication path established by the short-range communication unit; a display data transmitting unit to transmit the display data received by the display data receiving unit to the other transmission terminal using the network communication unit; and a display control unit to display the image data and/or the display data on a display device.

20 Claims, 16 Drawing Sheets

| DATA NUMBER | TERMINAL ID |
|---|---|
| 1 | TRANSMISSION TERMINAL 10aa |
| 2 | TRANSMISSION TERMINAL 10ba |
| 3 | TRANSMISSION TERMINAL 10ca |
| ... | ... |

| USER ID | PASSWORD |
|---|---|
| communication | ++++++ |
| triangle | ------ |
| ricoh-100 | ****** |
| ... | ... |

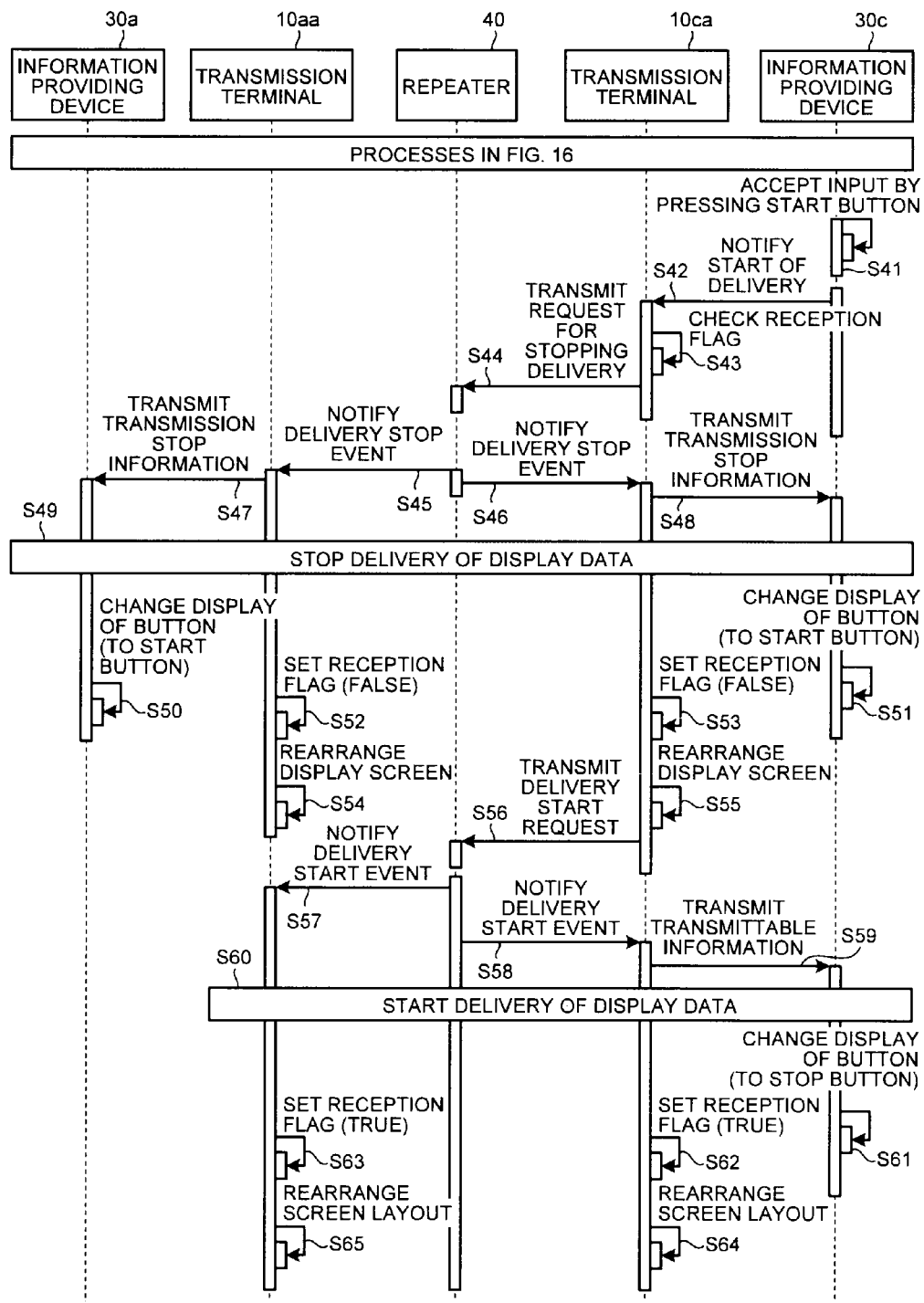

TRANSMISSION TERMINAL AND METHOD OF TRANSMITTING DISPLAY DATA

CROSS-REFERENCE TO RELATED APPLICATIONS

The present application claims priority to and incorporates by reference the entire contents of Japanese Patent Application No. 2010-208130 filed in Japan on Sep. 16, 2010 and Japanese Patent Application No. 2011-157166 filed in Japan on Jul. 15, 2011.

BACKGROUND OF THE INVENTION

1. Field of the Invention

The present invention relates to a transmission terminal and a method of transmitting display data.

2. Description of the Related Art

In recent years, a telephone call system that performs a conference or the like through a communication network such as the Internet has been widely used. In the telephone call system, a phone terminal including a camera, a microphone, a speaker, and the like is used. The phone terminal is configured to transmit and receive captured image data (image data) and sound data acquired with the camera and the microphone of each phone terminal when a phone call (communication) with other phone terminals is initiated whereby a videoconference can be realized.

Moreover, in the telephone call system, a screen of a presentation document and the like displayed on a phone terminal is often transmitted and received as display data in addition to the above-mentioned data in order to improve communication with a calling party. Moreover, in the respective phone terminals having received the display data, by displaying the display data on their display devices, the respective phone terminals can share the presentation document and the like. For example, Japanese Patent Application Laid-open No. 2006-018430 discloses a technology of enabling a screen on which a material is displayed to be shared between different devices.

By the way, it is possible to store the presentation document and the like in a mobile terminal that the user usually uses and to carry the mobile terminal to a desired location of a conference where the document is displayed and the display data is to be shared with a participant. However, in the telephone call system of the related art, when the user wants to share the display data using the mobile terminal, the user needs to follow a network connection procedure at respective conference locations. Thus, there is a problem in that the procedure to reach a step to share the display data is cumbersome and complicated.

For example, let us consider a situation in which the user goes out and uses a mobile terminal in a videoconference at a location different from a usual location. In this case, the user has to perform various connection settings such as to input an Internet Protocol (IP) address, a gateway address, or a Uniform Resource Locator (URL) address at a sharing destination of a conference. Thus, there has been a problem in that it incurs a labor and time for the user to be able to share the document data. In addition, in the technique disclosed in Japanese Patent Application Laid-open No. 2006-018430, although it is possible to share a screen on which material data is displayed between devices, the above problems cannot be solved since the user has to perform various connection settings each time the user starts sharing at various locations.

SUMMARY OF THE INVENTION

It is an object of the present invention to at least partially solve the problems in the conventional technology.

According to an aspect of the present invention, there is provided a transmission terminal including: a network communication unit configured to transceive predetermined data including image data with another transmission terminal connected to a communication network; a proximity communication unit configured to establish a proximity communication with an information providing apparatus in response to an approach of the information providing apparatus that displays a predetermined image and to transmit connection setting information required to establish a communication by a communication method capable of performing communication at a longer range than a communication method based on the proximity communication to the information providing apparatus; a short-range communication unit configured to establish a radio communication with the information providing apparatus by a communication method capable of performing communication at a longer range than the proximity communication unit using the connection setting information; a display data receiving unit configured to receive display data representing a screen being displayed by the information providing apparatus through a communication path established by the short-range communication unit; a display data transmitting unit configured to transmit the display data received by the display data receiving unit to the other transmission terminal using the network communication unit; and a display control unit configured to display the image data and/or the display data on a display device.

According to another aspect of the present invention, there is provided a method of transmitting display data, including: transceiving predetermined data including image data between a transmission terminal and another transmission terminal connected to a communication network by network communication unit; establishing a proximity communication with an information providing apparatus in response to an approach of the information providing apparatus that displays a predetermined image and transmitting connection setting information required to establish a communication by a communication method capable of performing communication at a longer range than a communication method based on the proximity communication to the information providing apparatus by a proximity communication unit; establishing a radio communication with the information providing apparatus by a communication method capable of performing communication at a longer range than the proximity communication unit using the connection setting information, by a short-range communication unit; receiving display data representing a screen being displayed by the information providing apparatus through a communication path established by the establishing of the radio communication by a display data receiving unit; transmitting the display data received by the receiving of the display data to the other transmission terminal using the network communication unit by a display data transmitting unit; and displaying the image data and/or the display data on display device by a display control unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram illustrating an example of a management table stored in a storage unit of the transmission terminal;

FIG. 6 is a diagram illustrating an example of an authentication table stored in the storage unit of the transmission terminal;

FIG. 18 is a diagram illustrating the process flow to change a source from where display data is transmitted.

DETAILED DESCRIPTION OF THE PREFERRED EMBODIMENTS

Figure 1:
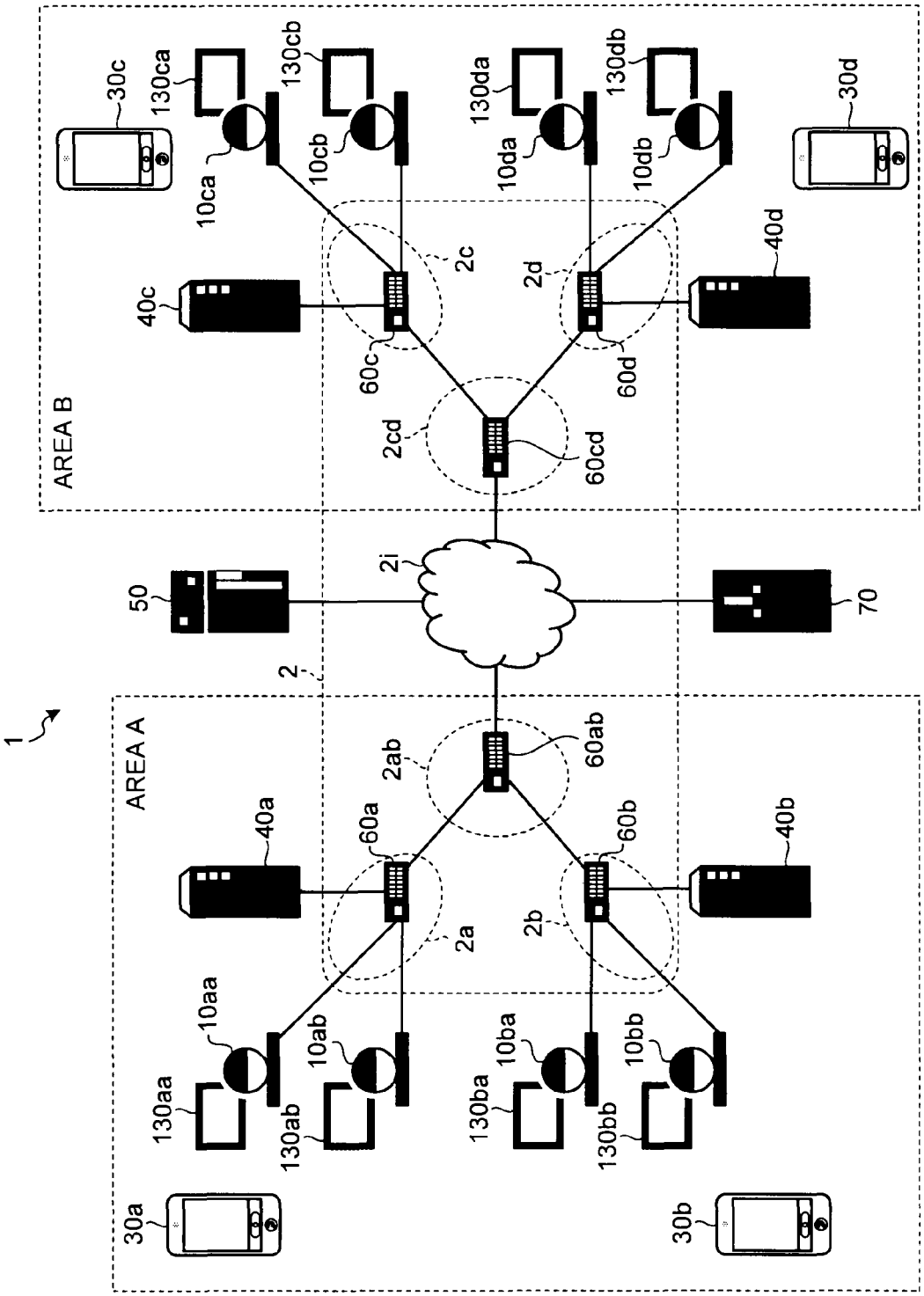
FIG. 1 is a diagram illustrating an example of a configuration of a transmission system according to the present embodiment.

Hereinafter, embodiments of a transmission terminal, a method of transmitting display data, a computer program, an information providing apparatus, and a transmission system according to the present invention will be described in detail with reference to the accompanying drawings. It should be noted that the present invention is not limited to the embodiments shown in the drawings.

FIG. 1 is a diagram illustrating an example of a configuration of the transmission system according to the present embodiment. First, an overview of the present embodiment will be described with reference to FIG. 1. In the present embodiment, a transmission system capable of performing a teleconference between spatially distant places will be described.

The transmission system includes a data providing system that transmits contents data in one direction from one transmission terminal to the other transmission terminal through a transmission management system and a communication system in which information, feelings, and the like are mutually transmitted between a plurality of transmission terminals through a transmission management system. The communication system is a system for allowing information, feelings, and the like to be mutually transmitted between a plurality of communication terminals (corresponding to "transmission terminals") through a communication management system (corresponding to a "transmission management system"). Examples of the communication system include a videoconference system, a video telephone system, an audio conference system, a voice telephony system, and a personal computer (PC) screen sharing system.

In the present embodiment, a transmission system, a transmission management system, and a transmission terminal will be described assuming that the videoconference system as an example of the communication system, the videoconference management system as an example of the communication management system, and the videoconference terminal as an example of the communication terminal. That is, the transmission terminal and the transmission management system of the present invention are applied not only to the videoconference system but also to the communication system or the transmission system.

A transmission system 1 shown in FIG. 1 includes a plurality of transmission terminals (10*aa*, 10*ab*, 10*ba*, 10*bb*, 10*ca*, 10*cb*, 10*da*, and 10*db*), displays (130*aa*, 130*ab*, 130*ba*, 130*bb*, 130*ca*, 130*cb*, 130*da*, and 130*db*) for the respective transmission terminals, information providing apparatuses (30*a*, 30*b*, 30*c*, and 30*d*) which provide information in cooperation with the transmission terminals, repeaters (40*a*, 40*b*, 40*c*, and 40*d*), a transmission management system 50, routers (60*a*, 60*b*, 60*ab*, 60*c*, 60*d*, and 60*cd*), and a computer program providing system 70.

In the present embodiment, an arbitrary transmission terminal among the transmission terminals (10*aa*, 10*ab*, 10*ba*, 10*bb*, 10*ca*, 10*cb*, 10*da*, and 10*db*) will be denoted by a "transmission terminal 10," an arbitrary display among the displays (130*aa*, 130*ab*, 130*ba*, 130*bb*, 130*ca*, 130*cb*, 130*da*, and 130*db*) will be denoted by a "display 130," an arbitrary information providing apparatus among the information providing apparatuses (30*a*, 30*b*, 30*c*, and 30*d*) will be denoted by an "information providing apparatus 30," an arbitrary repeater among the repeaters (40*a*, 40*b*, 40*c*, and 40*d*) will be denoted by a "repeater 40," and an arbitrary router among the routers (60*a*, 60*b*, 60*ab*, 60*c*, 60*d*, and 60*cd*) will be denoted by a "router 60". Moreover, the numbers of respective terminals and devices are not limited to the example of FIG. 1.

The transmission terminal 10 transmits and receives conference information such as image data (captured image data and display data to be described later) or sound data so as to perform telephone communication with another transmission terminal 10. That is, the telephone communication in the present embodiment includes transmission and reception of image data as well as transmission and reception of sound data.

Here, the conference information includes a material (for example, a sample of products) presented to participants of a conference at the location of telephone communication (teleconference) performed using the transmission terminal 10, portraits of the participants, distributed documents, and material images which are not distributed but displayed by a display device such as a projector on a screen or a display other than the display 130 of the transmission terminal 10. As above, the conference information means information which can be comprehended by participants in the conference location if the conference would be carried out face-to-face. In addition, the conference information may be at least one of the image data and the sound data, or, may be both. For example, when the conference information is made up of only the image data, the voice of participants may be expressed as a subtitle in an image. In the present embodiment, although a case in which the image of the image data is a moving image is described, the image may be a still image and may include both a moving image and a still image.

The information providing apparatus 30 is a mobile device, such as a mobile phone which is portable, a laptop personal computer (PC), or a smartphone. The information providing apparatus 30 communicates with the transmission terminal 10 using two kinds of communication methods between which the communicable distances are different and transmits (provides) the transmission terminal 10 with display data representing a screen displayed on a display 306 (which will be described later) of the information providing apparatus 30. Here, the screen display is carried out by the information providing apparatus 30 executing predetermined software (for example, software for creating a document, spreadsheet software, presentation software, and the like) loaded in advance to the information providing apparatus 30. Note that the screen means data of a still image or a moving image displayed on the display 306 (which will be described later) of the information providing apparatus 30. Moreover, although one information providing apparatus 30 is provided at each location (place of business) in FIG. 1, it should be noted that as the user (holder) of the information providing apparatus 30 moves, the information providing apparatus 30 can connect to the transmission terminal 10 at any optional location.

The repeater 40 is a repeater that relays communication between the transmission terminals 10. Specifically, the repeater 40 relays the conference information transmitted and received between a plurality of transmission terminals 10 to the respective transmission terminals 10 during telephone communication (teleconference) held with the use of the transmission terminals 10. Moreover, when a delay occurs in the reception of the conference information such as captured image data between the transmission terminal 10 and another transmission terminal 10 serving as a party, the repeater 40 transmits, after changing the resolution of the image data so as to decrease the information volume, the image data to the transmission terminal 10 of the party. In this way, the delay is eliminated to secure synchronous proceeding of the conference and the communication of the conference information. To the method of changing the resolution in accordance with the amount of delay, a well-known technique can be applied.

The transmission management system 50 manages the transmission terminal 10 and the repeater 40 in an integrated manner. Specifically, the transmission management system 50 manages the communication statuses of the transmission terminal 10 and the repeater 40 in an integrated manner. For example, the transmission management system 50 exchanges data with the transmission terminal 10 and the repeater 40 to manage registration of the transmission terminal 10 to the transmission system 1, to manage the terminal ID and the IP address of the transmission terminal 10, to manage billing of a service charge, to inform the respective transmission terminals 10 of another transmission terminal 10 that the transmission terminal 10 can communicate with, and to check the usages of the respective transmission terminals 10. Moreover, the transmission management system 50 notifies, as necessary, each transmission terminal 10 of the status (not connected, logging-in, during meeting, and the like) of another terminal 10.

The router 60 is a router device that interconnects networks and selects a communication path optimal for transmitting and receiving the conference information (image data and sound data).

The computer program providing system 70 includes a hard disk (HD) (not shown) storing a transmission terminal program for causing the transmission terminal 10 to realize various functions or causing the transmission terminal 10 to function as various means, and the computer program providing system 70 can transmit the transmission terminal program to the transmission terminal 10. Moreover, an information providing apparatus program for causing the information providing apparatus 30 to realize various functions or causing the information providing apparatus 30 to function as various means is also stored in the HD of the computer program providing system 70 that can transmit the information providing apparatus program to the information providing apparatus 30. Moreover, a repeater program for causing the repeater 40 to realize various functions or causing the repeater 40 to function as various means is also stored in the HD of the computer program providing system 70 that can transmit the repeater program to the repeater 40. Furthermore, a telephone communication management program for causing the transmission management system 50 to realize various functions or causing the transmission management system 50 to function as various means is also stored in the HD of the computer program providing system 70 that can transmit the telephone communication management program to the transmission management system 50.

Moreover, the transmission terminals 10aa and 10ab, the repeater 40a, and the router 60a are connected by a LAN 2a with each other in a communicable manner. The transmission terminals 10ba and 10bb, the repeater 40b, and the router 60b are connected by a LAN 2b with each other in a communicable manner. Moreover, the LANs 2a and 2b are connected by a dedicated line 2ab including the router 60ab in a communicable manner and are established inside a predetermined area A. For example, the area A is Japan, and the LAN 2a is established inside a place of business in Tokyo and the LAN 2b is established inside a place of business in Osaka.

On the other hand, the transmission terminals 10ca and 10cb, the repeater 40c, and the router 60c are connected by a LAN 2c in a communicable manner. The transmission terminals 10da and 10db, the repeater 40d, and the router 60d are connected by a LAN 2d with each other in a communicable manner. Moreover, the LANs 2c and 2d are connected by a dedicated line 2cd including the router 60cd with each other in a communicable manner and are established inside a predetermined area B. For example, the area B is USA, and the LAN 2c is established inside a place of business in New York and the LAN 2d is established inside a place of business in Washington D.C. The areas A and B are connected each other by connecting the routers 60ab and 60cd of the areas A and B, respectively, through the Internet 2i in a communicable manner.

Moreover, the transmission management system 50 and the computer program providing system 70 are connected to the transmission terminal 10 and the repeater 40 through the Internet 2i in a communicable manner. The transmission management system 50 and the computer program providing system 70 may be installed in the area A, the area B, or an area elsewhere.

In the present embodiment, a communication network 2 of the present embodiment is configured by the LANs 2a and 2b, the dedicated line 2ab, the Internet 2i, the dedicated line 2cd, and the LANs 2c and 2d. The communication network 2 may include a location where wireless communication as well as wired communication is allowed.

Next, hardware configurations of the transmission terminal 10 described above and an external information determination unit 20 will be described. First, a hardware configuration of the transmission terminal 10 will be described with reference to FIG. 2.

Figure 2:
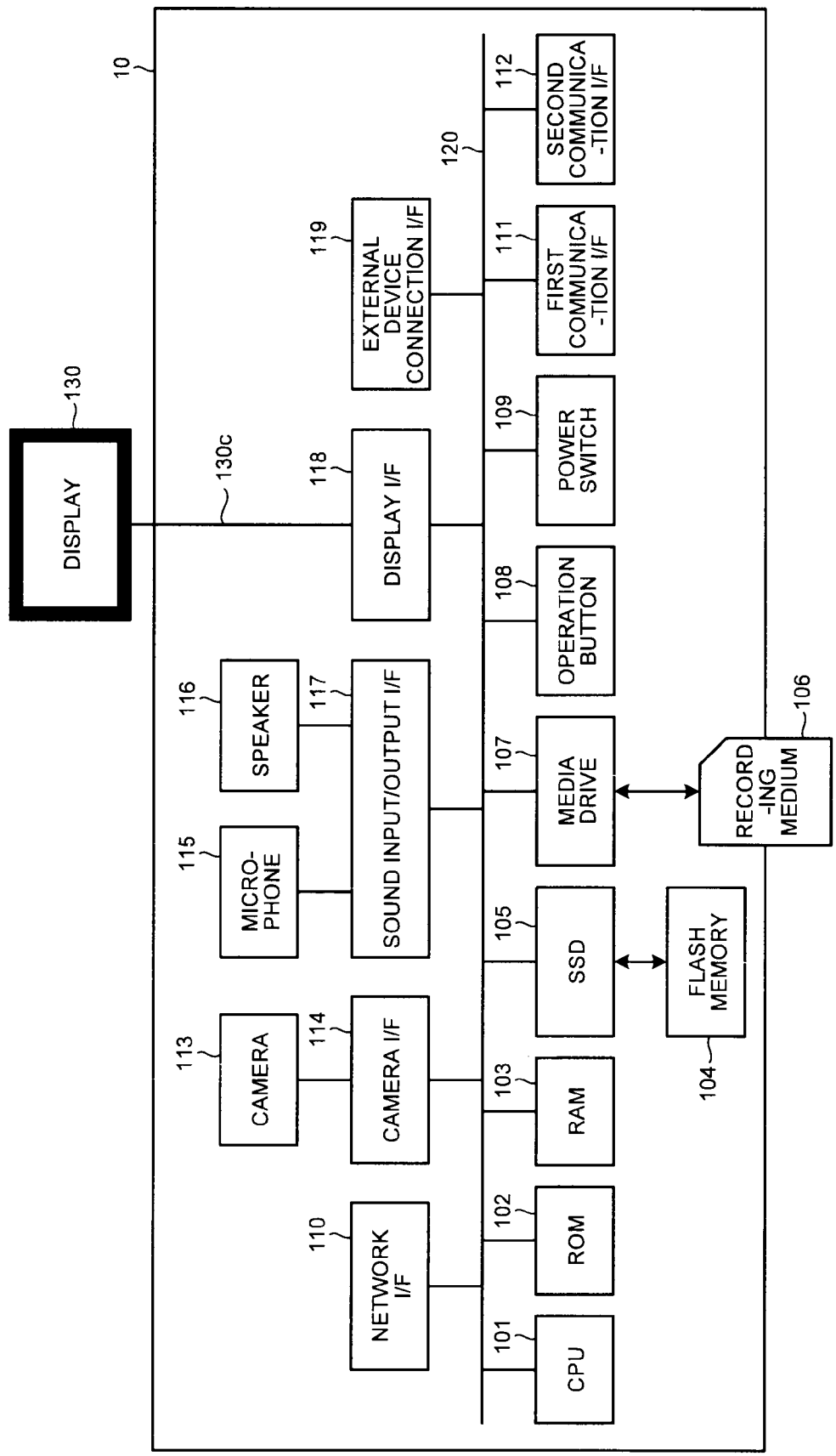
FIG. 2 is a diagram illustrating an example of a hardware configuration of a transmission terminal.

FIG. 2 is a diagram illustrating an example of a hardware configuration of the transmission terminal 10. As shown in the drawing, the transmission terminal 10 includes a central processing unit (CPU) 101 that controls the overall operation of the transmission terminal 10, a read only memory (ROM) 102 that stores various computer programs, a random access memory (RAM) 103 that is used as a work area of the CPU 101, a solid state drive (SSD) 105 that manages to read from or write to a flash memory 104 various kinds of data under the control of the CPU 101, a media drive 107 that manages to read/write various kinds of data from/to a recording medium 106 such as a memory card, an operation button 108 such as a cursor operated in selecting a destination of the transmission terminal 10, a power switch 109 for turning ON/OFF of the transmission terminal 10, and a network interface (I/F) 110 for transmitting data using the communication network 2.

Moreover, the transmission terminal 10 includes a first communication I/F 111 and a second communication I/F 112 as communication interfaces for transmitting/receiving various kinds of data to/from the information providing apparatus 30. Here, the first communication I/F 111 is a communication interface compatible with the radio communications standard of the non-contact integrated circuit (IC) called Near Field Communication (NFC), and the second communication I/F 112 is a communication interface compatible with the Bluetooth (registered trademark) communications standard.

Moreover, the transmission terminal 10 includes a camera 113 that output video data after capturing a video of a participant to the conference and a camera I/F 114 that controls to drive the camera 113 and to transmit and receive the image data captured by the camera 113. In addition, the camera 113 has incorporated therein an image capturing device such as a complementary metal oxide semiconductor (CMOS) or charge coupled device (CCD) image sensor that images a subject by the control of the CPU 101 to acquire image data. Moreover, the camera 113 is connected to the camera I/F 114 by a universal serial bus (USB) cable or the like.

Moreover, the transmission terminal 10 includes a sound input/output I/F 117 that processes, by the control of the CPU 101, the input and output of audio signals between a microphone 115 and a speaker 116. Here, the microphone 115 and the speaker 116 are connected to the sound input/output I/F 117 by the USB cable or the like. In addition, the sound collected by the microphone 115 is the sound (for example, the voice of an operator or the like of the subject transmission terminal 10) around the subject transmission terminal 10, and the sound output by the speaker 116 is the sound (for example, the voice or the like of the operator of another transmission terminal 10) transmitted from another transmission terminal 10.

Moreover, the transmission terminal 10 includes a display I/F 118 that transmits image data to the display 130 by the control of the CPU 101. The display 130 is connected to the display I/F 118 by a cable 130c. The cable 130c may be an analog RGB (VGA) signal cable, a component video cable, a signal cable according to the high-definition multimedia interface (HDMI) standard or the digital video interactive (DVI) standard, or the like.

In the present embodiment, although the display 130 is connected to the display I/F 118, the present invention is not limited thereto, and the display I/F 118 may be connected to a video output apparatus including a projection device such as a projector.

Moreover, the transmission terminal 10 includes an external device connection I/F 119 for connecting an external device. To the external device connection I/F 119, an external device such as an external camera, an external microphone, and an external speaker can be connected by the USB cable or the like. When an external camera is connected, the external camera is driven preferentially to the internal camera 113 by the control of the CPU 101. Similarly, when an external microphone or an external speaker is connected, the external microphone or the external speaker is driven preferentially to the internal microphone 115 or the internal speaker 116, respectively, by the control of the CPU 101.

In addition, the transmission terminal 10 includes a bus line 120 such as an address bus or a data bus for electrically connecting the respective constituent elements as shown in FIG. 2.

The recording medium 106 is configured to be removable from the transmission terminal 10. Moreover, the memory is not limited to the flash memory 104 but an electrically erasable and programmable ROM (EEPROM), for example, may be used as long as the memory is a nonvolatile memory that reads and writes data by the control of the CPU 101. Moreover, the display 130 is a display unit which is formed by a liquid crystal panel or an organic electro-luminescence (EL) panel that displays a subject image, an operation icon, and the like.

Moreover, the transmission terminal program executed by the transmission terminal 10 may be recorded on a computer-readable recording medium such as the recording medium 106 as a file having an installable format or an executable format and distributed. Moreover, the transmission terminal program may be stored in the ROM 102 rather than the flash memory 104. Moreover, the transmission terminal program may be downloaded from the computer program providing system 70 through the network I/F 110 and recorded on the flash memory 104 or the recording medium 106.

Figure 3:
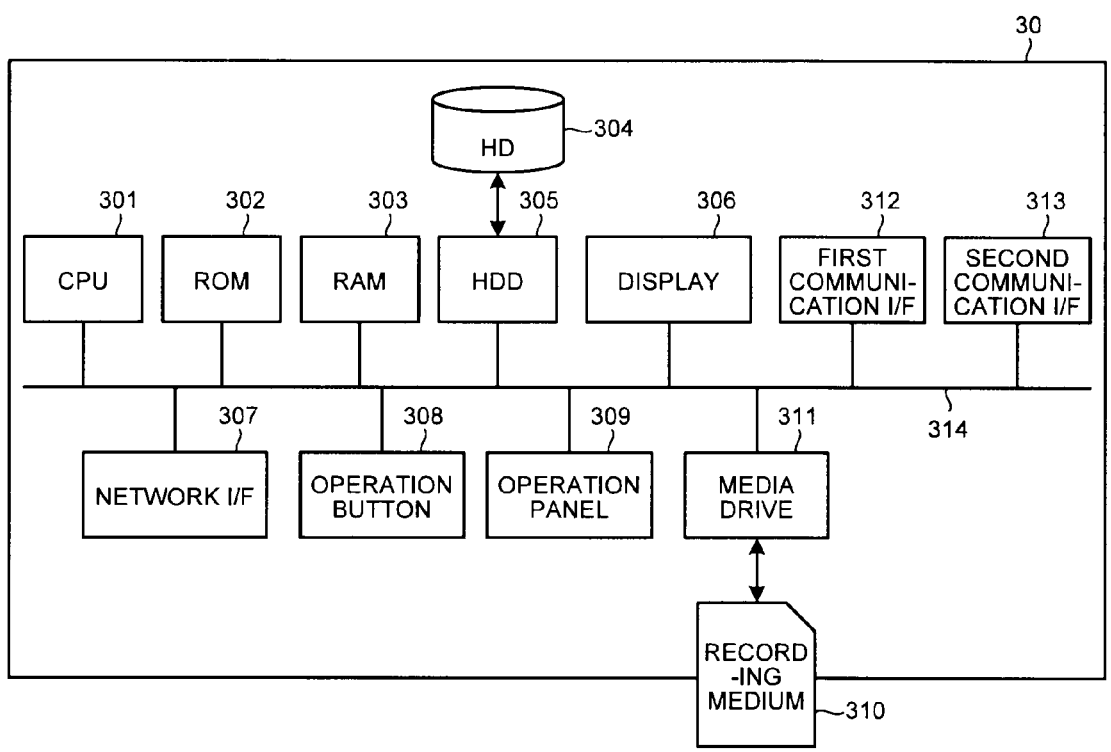
FIG. 3 is a diagram illustrating an example of a hardware configuration of an information providing apparatus.

Next, the hardware configuration of the information providing apparatus 30 will be described with reference to FIG. 3. FIG. 3 is a diagram illustrating an example of the hardware configuration of the information providing apparatus 30. As shown in the drawing, the information providing apparatus 30 includes a CPU 301 that controls the overall operation of the information providing apparatus 30, a ROM 302 that stores various computer programs used for driving the CPU 301, a RAM 303 that is used as a work area of the CPU 301, a hard disk (HD) 304 that stores various kinds of data such as the information providing apparatus program, a hard disk drive (HDD) 305 that controls reading from or writing to the HD 304 various kinds of data by the control of the CPU 301, the display 306 which is formed by a liquid crystal panel or an organic EL panel that displays various kinds of display information such as a cursor, a menu, a window, a character, or an image, a network I/F 307 for transmitting data using the communication network 2, an operation button 308 that is used when selecting and executing various instructions, selecting a processing target, and moving a cursor, an operation panel 309 which is formed by a touch panel and used for selecting and executing various instructions, selecting a processing target, and moving a cursor, and a media drive 311 that controls reading/writing of data from/to a recording medium 310 such as a flash memory.

Moreover, the information providing apparatus 30 includes a first communication I/F 312 and a second communication I/F 313 as communication interfaces for transmitting/receiving various kinds of data to/from the transmission terminal 10. Here, the first communication I/F 312 is a communication interface compatible with the non-contact IC radio communication standard of NFC, and the second communication I/F 313 is a communication interface compatible with the Bluetooth (registered trademark) communication standard.

In addition, the information providing apparatus 30 includes a bus line 314 such as an address bus or a data bus for electrically connecting the respective constituent elements as shown in FIG. 3. Moreover, the recording medium 310 is configured to be removable from the information providing apparatus 30.

Moreover, the information providing apparatus program executed by the information providing apparatus 30 may be recorded on a computer-readable recording medium such as the recording medium 310 as a file having an installable format or an executable format and distributed. Moreover, the information providing apparatus program may be stored in the ROM 302 rather than the HD 304. Moreover, the information providing apparatus program may be downloaded from the computer program providing system 70 through the network I/F 307 and recorded on a computer-readable recording medium such as the HD 304 or the recording medium 310.

Moreover, the repeater 40, the transmission management system 50, and the computer program providing system 70 are servers and have the same computer configuration as the information providing apparatus 30 (illustration thereof is not provided). The CPU of each of the repeater 40, the transmission management system 50, and the computer program providing system 70 realizes the functions of the respective devices by executing a computer program stored in a storage medium of the subject device or a computer program provided from the computer program providing system 70.

Figure 4:
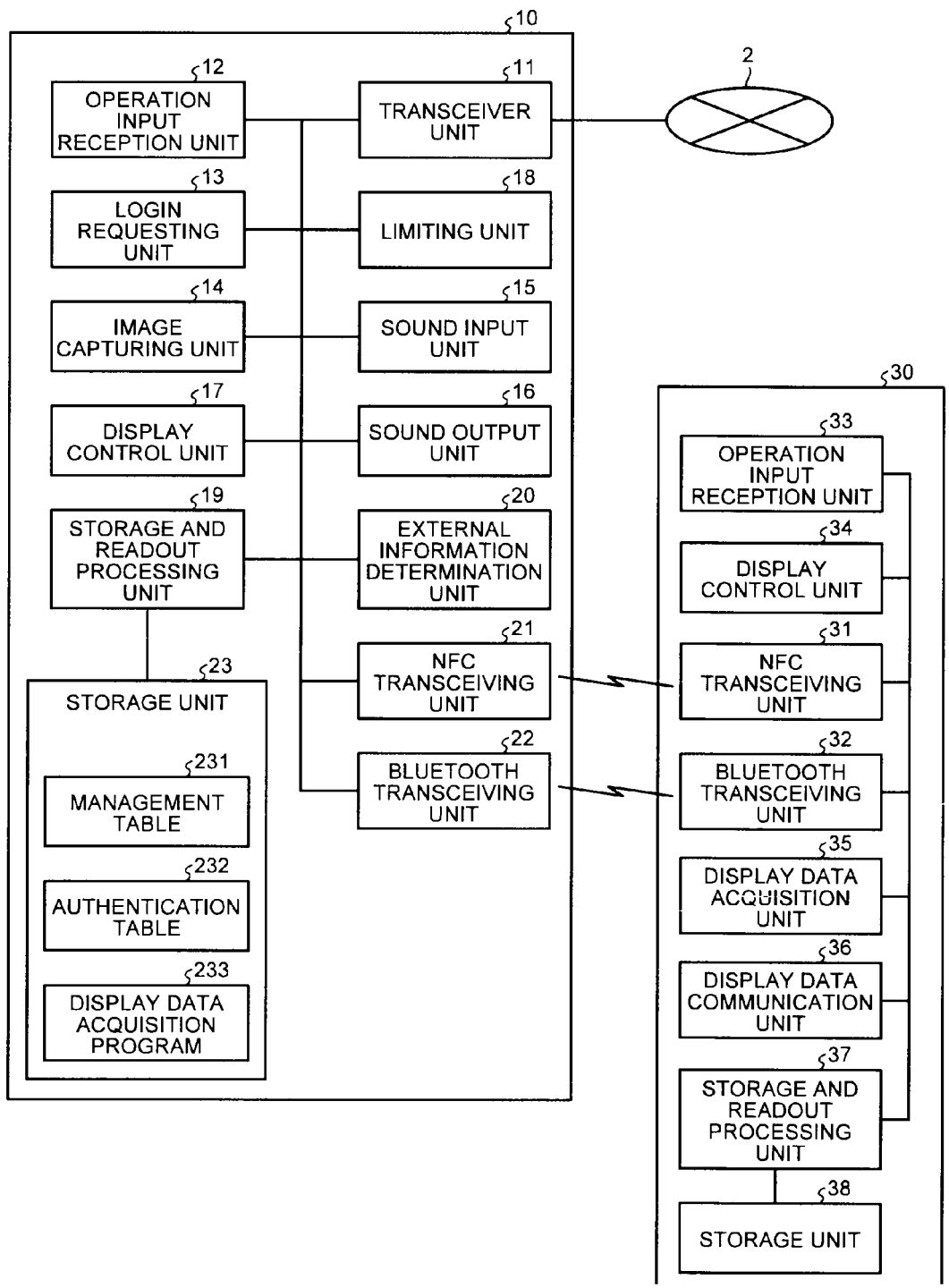
FIG. 4 is a block diagram illustrating a functional configuration of the transmission terminal and the information providing apparatus.

Next, a functional configuration of the transmission terminal 10 and the information providing apparatus 30 described above will be described. FIG. 4 is a block diagram illustrating the functional configuration of the transmission terminal 10 and the information providing apparatus 30.

As shown in FIG. 4, the transmission terminal 10 includes a transceiver 11, an operation input accepting unit 12, a login requesting unit 13, an image capturing unit 14, a sound input unit 15, a sound output unit 16, a display control unit 17, a selecting unit 18, a storage and readout processing unit 19, the external information determination unit 20, an NFC transceiver 21, and a Bluetooth transceiver 22. The respective units are functions or means which are realized or caused to function when any of the respective constituent elements as shown in FIG. 2 operates by a command from the CPU 101 that is managed by the transmission terminal program expanded into the RAM 103. Moreover, the transmission terminal 10 includes a storage unit 23 which is formed by the SSD 105 shown in FIG. 2.

The transceiver 11 of the transmission terminal 10 is realized by a command from the CPU 101 shown in FIG. 2 and the network I/F 110 shown in FIG. 2 and transmits and receives various kinds of data (information) to and from another terminal, an apparatus, or a system through the communication network 2. Moreover, when communication is established with another transmission terminal 10 serving as a conference party through the repeater 40, the transceiver 11 registers the terminal ID of the other transmission terminal 10 to a management table 231 (to be described later) stored in the storage unit 23 to thereby manage the terminal ID of the transmission terminal 10 serving as the calling party (conference party). In addition, the terminal ID of the transmission terminal 10 is a host name or an IP address, for example, assigned in advance to each transmission terminal 10, and is identification information capable of identifying each transmission terminal 10.

The operation input accepting unit 12 is realized by the commands from the CPU 101 shown in FIG. 2 and the operation button 108 and the power switch 109 shown in FIG. 2, and receives various inputs by the operator of the transmission terminal 10. For example, when selecting the transmission terminal 10 of a conference party, the operator selects a transmission terminal 10 used by a conference party with a cursor key and presses an OK button on a selection screen (not shown) for selecting a conference party displayed on the display 130, whereby the terminal ID or IP address of the selected transmission terminal 10 is received as a conference party. Moreover, when the arrangement or size (layout) of the image data displayed on the screen is changed, the operation input accepting unit 12 receives information on the change instruction through the operation button 108 or the like from the operator of the subject transmission terminal 10.

The login requesting unit 13 is realized by the commands from the CPU 101 shown in FIG. 2, and automatically transmits login request information requesting the subject transmission terminal 10 to log in to the transmission management system 50 and the current IP address of the subject transmission terminal 10 through the communication network 2 from the transceiver 11. Here, the login request information includes at least the terminal ID, and the transmission management system 50 manages the login request information (terminal IDs) and the IP addresses transmitted from the respective transmission terminals 10. It is assumed that the login request information and the IP address are set to be automatically transmitted to the transmission management system 50 when the transmission terminal 10 is turned on.

The image capturing unit 14 is realized by the commands from the CPU 101 shown in FIG. 2 and the camera 113 and the camera I/F 114 shown in FIG. 2, and captures the image of a conference room including attendees as subjects and outputs image data obtained by the capturing.

The sound input unit 15 is realized by the commands from the CPU 101 shown in FIG. 2 and the sound input/output I/F 117 shown in FIG. 2, and converts the sounds around the transmission terminal 10 collected by the microphone 115 into sound signals to generate sound data. The sound output unit 16 is realized by the commands from the CPU 101 shown in FIG. 2 and the sound input/output I/F 117 shown in FIG. 2, and outputs the sound data or the like transmitted from another transmission terminal 10 to the speaker 116, thereby to cause a sound to be output from the speaker 116.

The display control unit 17 is realized by the commands from the CPU 101 shown in FIG. 2 and the display I/F 118 shown in FIG. 2, and transmits the image data and the display data to the display 130 and controls to display these data.

The selecting unit 18 is realized by the commands from the CPU 101 shown in FIG. 2 and the network I/F 110 shown in FIG. 2, and performs a process of selecting one repeater 40 from a plurality of repeaters 40. Specifically, the selecting unit 18 calculates, in units of milliseconds, the turnaround time elapsed since when predetermined transmission information is transmitted to the repeater 40 until when response information (ACK=Acknowledgment) to the transmission information is received from the repeater 40 and selects the repeater 40 that relays the information within the shortest period of time in terms of the turnaround time as the repeater 40 to be used, thereby to select one particular repeater 40 from the plurality of repeaters 40.

The storage and readout processing unit 19 is realized by the commands from the CPU 101 shown in FIG. 2 and the SSD 105 shown in FIG. 2, and performs a process of storing various kinds of data in the storage unit 23 and reading various kinds of data stored in the storage unit 23.

The storage unit 23 stores the management table 231 (see FIG. 5) for managing the terminal identification (ID) of the other transmission terminal 10 serving as a conference party and an authentication table 232 (see FIG. 6) in which authentication information (user ID and password) for determining to provide the permission for use of the information providing apparatus 30 is stored. Moreover, the storage unit 23 stores a display data acquisition program 233, a data transmission driver, and the like which are executed by the CPU 301 of the information providing apparatus 30 when the subject storage unit 23 is mounted on the information providing apparatus 30. In addition, the display data acquisition program 233 is a computer program for causing a display data acquisition unit 35 to be realized in the information providing apparatus 30.

Here, FIG. 5 is a diagram illustrating an example of the management table 231 stored in the storage unit 23. As shown in the drawing, the terminal ID of the transmission terminal 10 serving as a conference party is registered in the management table 231 so as to be correspondent with a data number. Here, the terminal IDs (transmission terminal 10aa, transmission terminal 10ba, and transmission terminal 10ca) of the transmission terminal 10 of the conference party are registered in the column to store the terminal IDs. Moreover, the data numbers are the management numbers for managing the respective terminal IDs, and are used when the image data (captured image data) delivered from the transmission terminals 10 of the respective terminal IDs is allocated to a display region described later.

Moreover, FIG. 6 is a diagram illustrating an example of the authentication table 232 stored in the storage unit 23. As shown in the drawing, the authentication table 232 is made up of a column (user ID column) storing user IDs and a column (password column) storing passwords, and the user IDs and passwords of authorized users of the information providing apparatus 30 are stored by being associated with each other. Moreover, it is assumed that authentication information made up of a set of user ID and password is delivered in advance to the authorized user of the information providing apparatus 30.

Returning to FIG. 4, the external information determination unit 20 is realized by the CPU 101 shown in FIG. 2, and determines whether data has been transmitted to or received from the information providing apparatus 30 that is provided outside the transmission terminal 10.

The NFC transceiver 21 is realized by the commands from the CPU 101 shown in FIG. 2 and the first communication I/F 111 shown in FIG. 2, and performs non-contact communication (hereinafter referred to as NFC communication) with a NFC transceiver 31, to be described later, of the information providing apparatus 30 via non-contact communications based on the NFC standard.

Here, the NFC transceiver 21 transmits and receives data by non-contact radio communication of which the communication distance, about 10 cm at maximum, is shorter than that of the second communication I/F 112 (the Bluetooth transceiver 22) which is another communication unit. Because the non-contact communication based on the NFC standard by the NFC transceiver 21 is slower (maximum rate: 424 kbps) in data transfer rate than the radio communication based on the Bluetooth (registered trademark) communication standard (maximum rate: 24 Mbps) by the Bluetooth transceiver 22, the NFC transceiver 21 is used for communication of a relatively small volume of data. In addition, the NFC transceiver 21 is not limited to the NFC standard; a functional unit compatible with other communication standards may be realized by using a communication interface based on other communication standards as the first communication I/F 111 if a radio communication is possible at a relatively near range, namely at a smaller communication range than the communication range of the radio communication based on the Bluetooth (registered trademark) communication standard described later.

The NFC transceiver 21 performs, when the information providing apparatus 30 approaches inside the communication area of the NFC transceiver 21, the NFC communication with the NFC transceiver 31 (which will be described later) of the information providing apparatus 30 to receive authentication information transmitted from the NFC transceiver 31 and transmit connection setting information necessary for establishing radio communication (hereinafter referred to as Bluetooth communication) based on the Bluetooth (registered trademark) communication standard to the NFC transceiver 31. Here, the connection setting information is the information necessary for the Bluetooth transceiver 22 to perform radio communication and includes a Bluetooth device (BD) address, a passphrase, and the like assigned to the second communication I/F 112. In addition, the connection setting information may be possessed by the NFC transceiver 21, and the NFC transceiver 21 may read the connection setting information from the second communication I/F 112.

The Bluetooth transceiver 22 is realized by the commands from the CPU 101 shown in FIG. 2 and the second communication I/F 112 shown in FIG. 2 and wirelessly communicates with the information providing apparatus 30 by the Bluetooth (registered trademark) communication standard which is a short-range communication means. The Bluetooth transceiver 22 transmits and receives a large volume (maximum rate: 24 Mbps) of data as compared to the NFC transceiver 21 which is compatible with the non-contact communication method based on the NFC standard. Moreover, since the Bluetooth transceiver 22 enables communication to be performed at an inter-device distance of about 10 to 100 m, the communication range thereof is enlarged as compared to the communication range of the NFC transceiver 21.

Moreover, when transmitting and receiving data to and from the information providing apparatus 30, the Bluetooth transceiver 22 establishes the Bluetooth communication with the information providing apparatus 30 using the connection setting information that the NFC transceiver 21 has transmitted to the information providing apparatus 30.

In the present embodiment, although a communication I/F compatible with the Bluetooth (registered trademark) communication standard is used as the second communication I/F 112, the present invention is not limited to this. Instead, a communication I/F compatible with the Wireless Fidelity (WiFi) scheme based on other standards such as IEEE 802.11a or IEEE 802.11b standard may be used. In this case, a WiFi transceiver corresponding to the Bluetooth transceiver 22 may be configured by a network board supporting the IEEE 802.11a/b/g/n standards may also be used, responsible for transmitting and receiving data and a communication control unit (communication control program) that controls establishment of radio communication based on the IEEE 802.11a/b/g/n and transmission and reception of data.

Moreover, when an ultra wide band (UWB) communication scheme is used, and the inter-device distance is within 3 m, radio communication may be performed with the Wireless USB standard capable of communicating at the speed of 480 Mbps equivalent to the wired USB 2.0. In this case, a wireless USB transceiver comparable to the Bluetooth transceiver 22 may be configured by a USB device compatible with the Wireless USB standard, responsible for transmitting and receiving of data and a communication control unit (communication control program) that controls establishment of radio communication based on the UWB communication method and transmission and reception of data.

Next, the information providing apparatus 30 will be described. As shown in FIG. 4, the information providing apparatus 30 includes the NFC transceiver 31, a Bluetooth transceiver 32, an operation input accepting unit 33, a display control unit 34, the display data acquisition unit 35, a display data communication unit 36, and a storage and readout processing unit 37. The respective units are functions or means which are realized or caused to function when any of the respective constituent elements operates by the commands from the CPU 301 in accordance with the information providing apparatus program uncompressed in the RAM 303. Moreover, the information providing apparatus 30 includes a storage unit 38 which is formed by the HDD 305 shown in FIG. 3.

The NFC transceiver 31 is realized by the commands from the CPU 301 shown in FIG. 3 and the first communication I/F 312 shown in FIG. 3 and communicates with the NFC transceiver 21 of the transmission terminal 10 in a non-contacting manner by NFC communication based on the NFC standard.

Moreover, when the subject information providing apparatus 30 approaches within the communication area of the NFC transceiver 21 of the transmission terminal 10, the NFC transceiver 31 establishes the NFC communication with the NFC transceiver 21 of the transmission terminal 10 to transmit to and receive from various kinds of data (information). Specifically, when the NFC communication is established with the NFC transceiver 21 of the transmission terminal 10, the NFC transceiver 31 transmits the authentication information input by the user of the subject device to the transmission terminal 10 or receives the connection setting information possessed by the NFC transceiver 21 of the transmission terminal 10. In the present embodiment, the authentication information input to the information providing apparatus 30 by the user of the information providing apparatus 30 is transmitted back to the transmission terminal 10 serving as a communication destination, whereby the transmission terminal 10 executes authentication of the authentication information.

The Bluetooth transceiver 32 is realized by the commands from the CPU 301 shown in FIG. 3 and the second communication I/F 313 shown in FIG. 3, and transmits the display data acquired by the display data acquisition unit 35 (which will be described later) to the transmission terminal 10 when communication is established with the Bluetooth transceiver 22 of the transmission terminal 10. Moreover, the Bluetooth transceiver 32 receives, from the transmission terminal 10, information or the like showing a sharing status of the display data.

Figure 7:
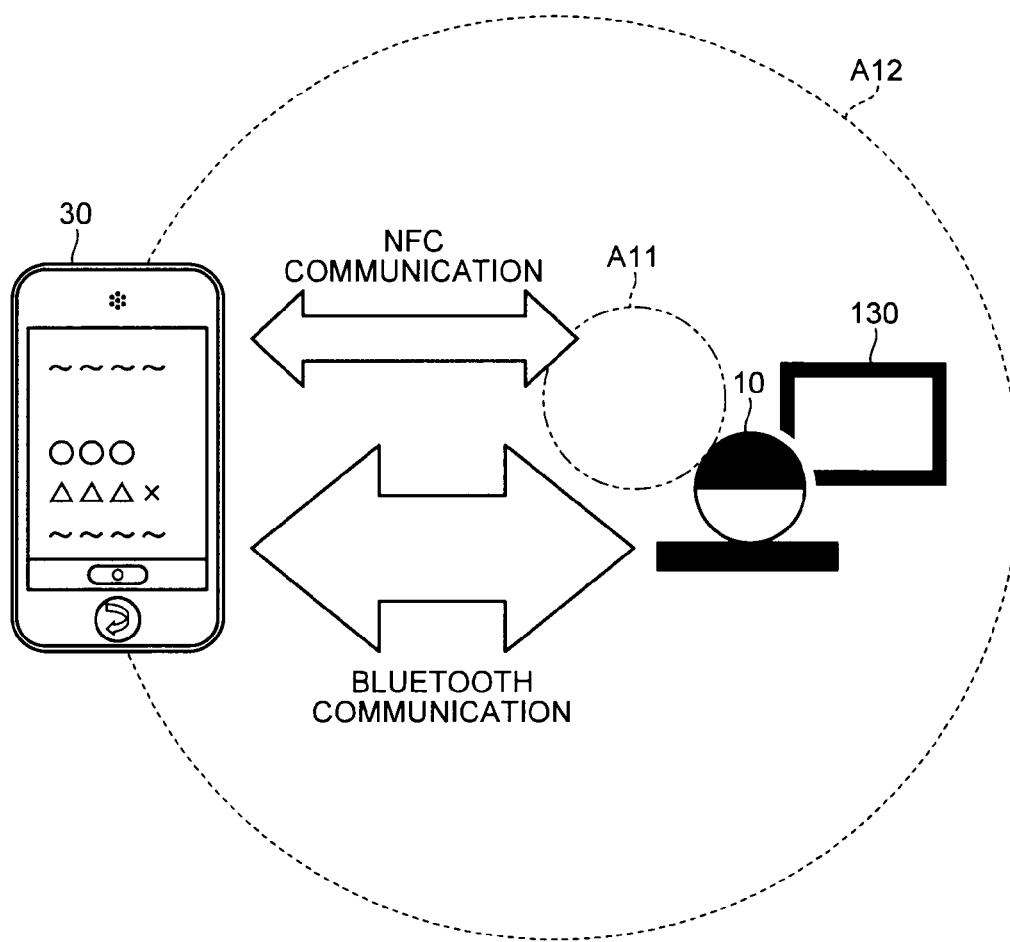
FIG. 7 is a diagram illustrating the range of radio communication for connecting the transmission terminal and the information providing apparatus.

Here, FIG. 7 is a diagram illustrating the communication range of the radio communication that connects the transmission terminal 10 and the information providing apparatus 30. In the drawing, a communication range A11 depicted by a two-dot chain line indicates the communication range of the NFC standard, namely the range of proximity radio communication where the NFC transceiver 21 and the NFC transceiver 31 can communicate with each other. Moreover, a communication range A12 depicted by a broken line indicates the communication range of the Bluetooth (registered trademark) communication standard, namely the range of short-range radio communication where the Bluetooth transceiver 22 and the Bluetooth transceiver 32 can communicate with each other. As above, the communication range A12 is larger than the communication range A11, and hence, communication can be held at a longer distance with the Bluetooth communication than the NFC communication.

As described above, the NFC transceiver 21 and the NFC transceiver 31 automatically establish the NFC communication upon entering the communication range A11, and exchange the authentication information and the connection setting information. After that, when the authentication information is accepted by the transmission terminal 10, the Bluetooth transceiver 22 and the Bluetooth transceiver 32 establish the Bluetooth communication using the previously exchanged connection setting information.

As above, the connection setting information necessary for the Bluetooth communication between the transmission terminal 10 and the information providing apparatus 30 is exchanged by the NFC communication in which transmission and reception of data is easy. Moreover, the user of the information providing apparatus 30 can obtain information necessary for establishing the Bluetooth communication between the devices simply by bringing the information providing apparatus 30 in proximity to the transmission terminal 10. In this way, it is possible to specify the transmission terminal 10 which is a communication party without performing any special operation and perform the Bluetooth communication. Thus, it is possible to improve the utility.

Returning to FIG. 4, the operation input accepting unit 33 is realized by the commands from the CPU 301 illustrated in FIG. 3 and the operation button 308 and the operation panel 309 illustrated in FIG. 3, and receives the input through the operation of the user.

The display control unit 34 is realized by the commands from the CPU 301 illustrated in FIG. 3 and the display 306 illustrated in FIG. 3, and displays various kinds of information such as a cursor, a menu, a window, a character, or an image on the display 306.

The display data acquisition unit 35 is realized by the cooperation of the CPU 301 illustrated in FIG. 3 and the display data acquisition program 233 stored in the storage unit 23 of the transmission terminal 10, and acquires the display data on various kinds of information to be displayed on the display 306 by the display control unit 34.

The display data communication unit 36 is realized by the commands from the CPU 301 illustrated in FIG. 3 and the second communication I/F 313 illustrated in FIG. 3, and transmits the display data acquired by the display data acquisition unit 35 to the transmission terminal 10 through the Bluetooth transceiver 32. Moreover, the display data communication unit 36 receives various kinds of information transmitted from the transmission terminal 10 in accordance with a change of the status.

The storage and readout processing unit 37 is realized by the commands from the CPU 301 illustrated in FIG. 3 and the HDD 305 illustrated in FIG. 3, and performs a process of storing various kinds of data in the storage unit 38 and reading various kinds of data stored in the storage unit 38. In the storage unit 38, data (hereinafter referred to as document data) of documents or the like to be shared during a conference, various kinds of computer programs (a word processor program, a spreadsheet program, and a presentation program) for displaying the document data, and the like are stored in advance.

Next, data displayed on the display 130 of the transmission terminal 10 of the transmission system 1 described above will be described. Examples of the data displayed on the display 130 of the transmission terminal 10 in a teleconference location includes the captured image data captured by the camera 113 and the display data transmitted from the information providing apparatus 30. Here, the captured image data means image data which are captured by the cameras 113 of the subject and other transmission terminals 10. Moreover, the display data represent the screen displayed on the display 306 of the information providing apparatus 30.

Figure 8:
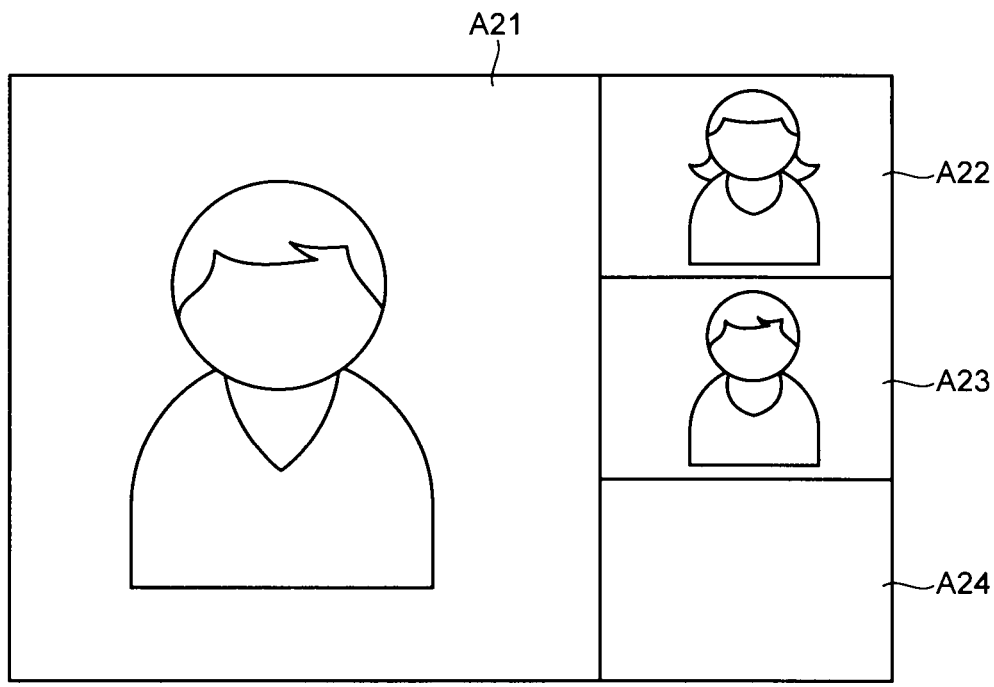
FIG. 8 is a diagram illustrating an example of a display screen displayed on a display of the transmission terminal.

FIG. 8 is a diagram illustrating an example of a screen displayed on the display 130 of the transmission terminal 10. In the drawing, an example where one screen is split into four regions is illustrated. Specifically, a large region (first display region) extending from the left to the center of the screen is a display region A21, and the three small regions (second display regions) extending from the top right portion to the bottom right portion of the screen are display regions A22 to A24. In the case of the screen arrangement illustrated in FIG. 8, the captured image data of the transmission terminal 10 to which a participant to a conference speaks toward the microphone 115 can be allocated to the display region A21, for example. This process will be described below.

First, the CPU 101 of each transmission terminal 10 detects an interval of a speech, input through the sound input unit 15, of the operator of the subject transmission terminal 10, and transmits the terminal ID of the subject transmission terminal 10 to other transmission terminals 10 through the repeater 40 when the interval is detected. When the terminal ID is received by each transmission terminal 10, the display control unit 17 of each transmission terminal 10 specifies a data number matching the terminal ID by referencing to the management table 231 illustrated in FIG. 4. Moreover, the display control unit 17 allocates and displays the captured image data received from the transmission terminal 10 of the terminal ID related with the specified data number to the display region A21. Moreover, the display control unit 17 allocates and displays the captured image data received from the transmission terminals 10 of the terminal IDs related with the other data numbers sequentially to the other display regions starting with the display region A22. In this way, because the captured image data of the transmission terminal 10 of which the operator is currently speaking is disposed close to the center of the display screen and displayed in a larger size than the others, the captured image of the speaking participant can be viewed better and be emphasized of his/her presence. In addition, the order of allocating the data numbers to the display regions A22 to A24 is not particularly limited, but may be sorted in increasing or decreasing order, for example.

Figure 9:
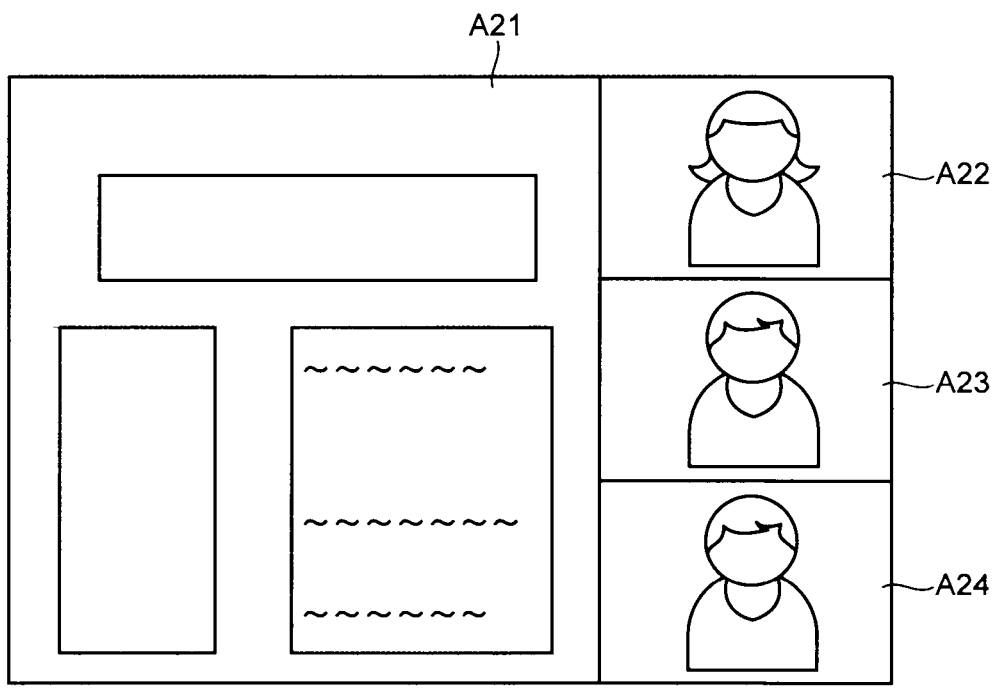
FIG. 9 is a diagram illustrating an example of the display screen displayed on the display of the transmission terminal.

Moreover, when display data is transmitted from the information providing apparatus 30, as illustrated in FIG. 9, the display control unit 17 allocates and displays the display data to the display region A21 and allocates and displays the captured image data of the respective transmission terminals 10 sequentially to the other display regions starting with the display region A22. In this way, since the display data is disposed close to the center of the display screen and displayed in a larger size than the others, the captured image of the presentation documents can be viewed better with emphasis.

Figure 10:
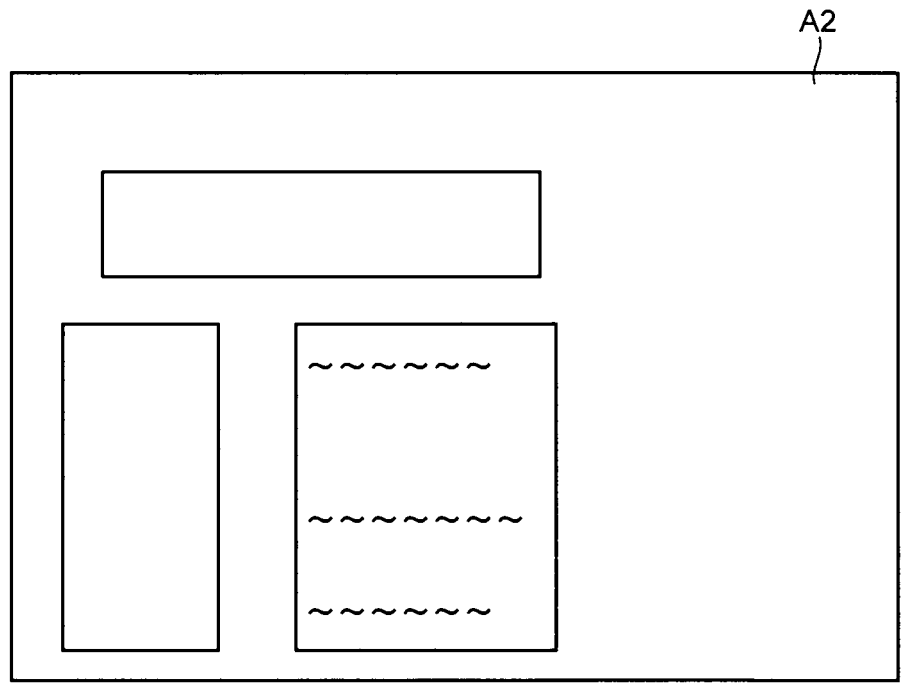
FIG. 10 is a diagram illustrating an example of the display screen displayed on the display of the transmission terminal.

The display examples described above may be modified in the following manner. When display data is transmitted from the information providing apparatus 30, as illustrated in FIG. 10, the display data may be allocated to the entire screen (display region A2) so that the display data is displayed on the entire screen. Moreover, when a predetermined button (for example, a cursor key) of the transmission terminal 10 is pressed by the user, and the input of the predetermined button is received by the operation input accepting unit 12, the display control unit 17 changes the screen display to the screen of FIG. 8. After that, whenever the user presses the predetermined button, the display screen is alternately changed between that of FIG. 10 and that of FIG. 8. With this configuration, it is possible to check the captured image data, namely persons at other locations, transmitted from other transmission terminals 10 according to a situation even when the document data is displayed.

Next, the operation when connecting the information providing apparatus 30 to a transmission terminal 10 being connected to other transmission terminals 10 will be described with reference to FIGS. 11 to 14.

Figure 11:
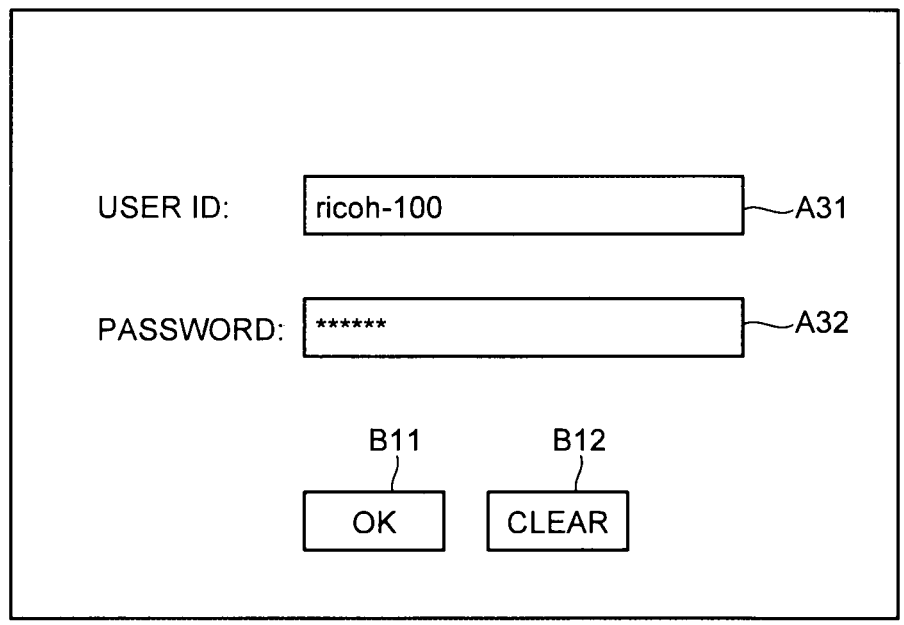
FIG. 11 is a diagram illustrating an example of a login screen displayed on the display of the information providing apparatus.
Figure 12:
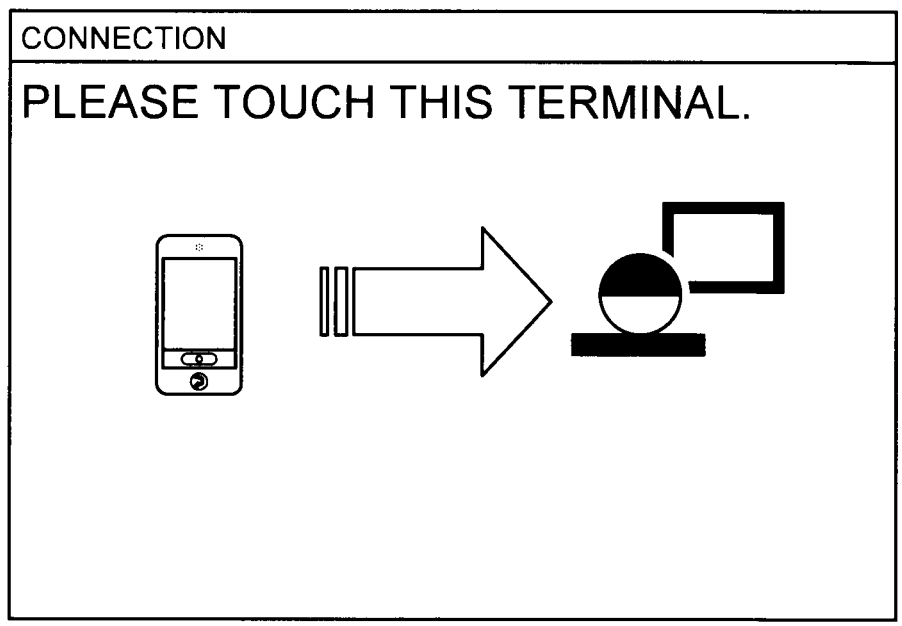
FIG. 12 is a diagram illustrating an example of a navigation screen displayed on the display of the information providing apparatus.

First, in the information providing apparatus 30, when a predetermined operation to start to use a subject device is accepted by the operation input accepting unit 33, the display control unit 34 displays a login screen illustrated in FIG. 11 on the display 306. Here, areas A31 and A32 are areas for inputting authentication information (user ID and password). Although the detailed processing flow is described later, the authentication information registered in the authentication table 232 of the transmission terminal 10 that makes connection with the information providing apparatus 30 is input to the areas A31 and A32, whereby the function of the display data acquisition unit 35 of the information providing apparatus 30 can be used.

Moreover, an OK button B11 is a button for instructing to inform the CPU 301 (the operation input accepting unit 33) included in the information providing apparatus 30 of the authentication information input to the areas A31 and A32. A Clear button B12 is a button for instructing to clear the authentication information input to the areas A31 and A32, and when the clear button B12 is pressed, the authentication information input to the areas A31 and A32 is cleared by the display control unit 34.

After the user of the information providing apparatus 30 inputs the authentication information to the areas A31 and A32 through the operation button 308 and the operation panel 309 of the information providing apparatus 30, when the OK button B11 is pressed, the operation input accepting unit 33 accepts the input authentication information. Moreover, the display control unit 34 displays a navigation screen, illustrated in FIG. 12, that guides an operation procedure on the display 306 in response to the pressing of the OK button B11. In addition, on the navigation screen of FIG. 12, the user is asked to bring the information providing apparatus 30 in contact with the transmission terminal 10, namely to execute NFC communication between the transmission terminal 10 and the information providing apparatus 30.

Following the navigation screen, when the user brings the information providing apparatus 30 in contact (proximity) with the transmission terminal 10, an NFC communication is established between the NFC transceiver 31 (the first communication I/F 312) of the information providing apparatus 30 and the NFC transceiver 21 (the first communication I/F 111) of the transmission terminal 10. Moreover, the display control unit 34 clears the screen illustrated in FIG. 12 from the display 306 in accordance with establishment of the NFC communication.

The Bluetooth transceiver 32 of the information providing apparatus 30 communicates with the Bluetooth transceiver 22 of the transmission terminal 10 using the connection setting information of the transmission terminal 10 obtained by the NFC communication and performs a mounting process of the storage unit 23 of the transmission terminal 10. Moreover, when the mounting of the storage unit 23 is completed successfully, the CPU 301 of the information providing apparatus 30 executes the display data acquisition program 233 stored in the storage unit 23 to realize the display data acquisition unit 35. Hereinafter, the process flow up to when the display data acquisition program 233 of the transmission terminal 10 is activated by the information providing apparatus 30 will be described with reference to FIG. 13.

Figure 13:
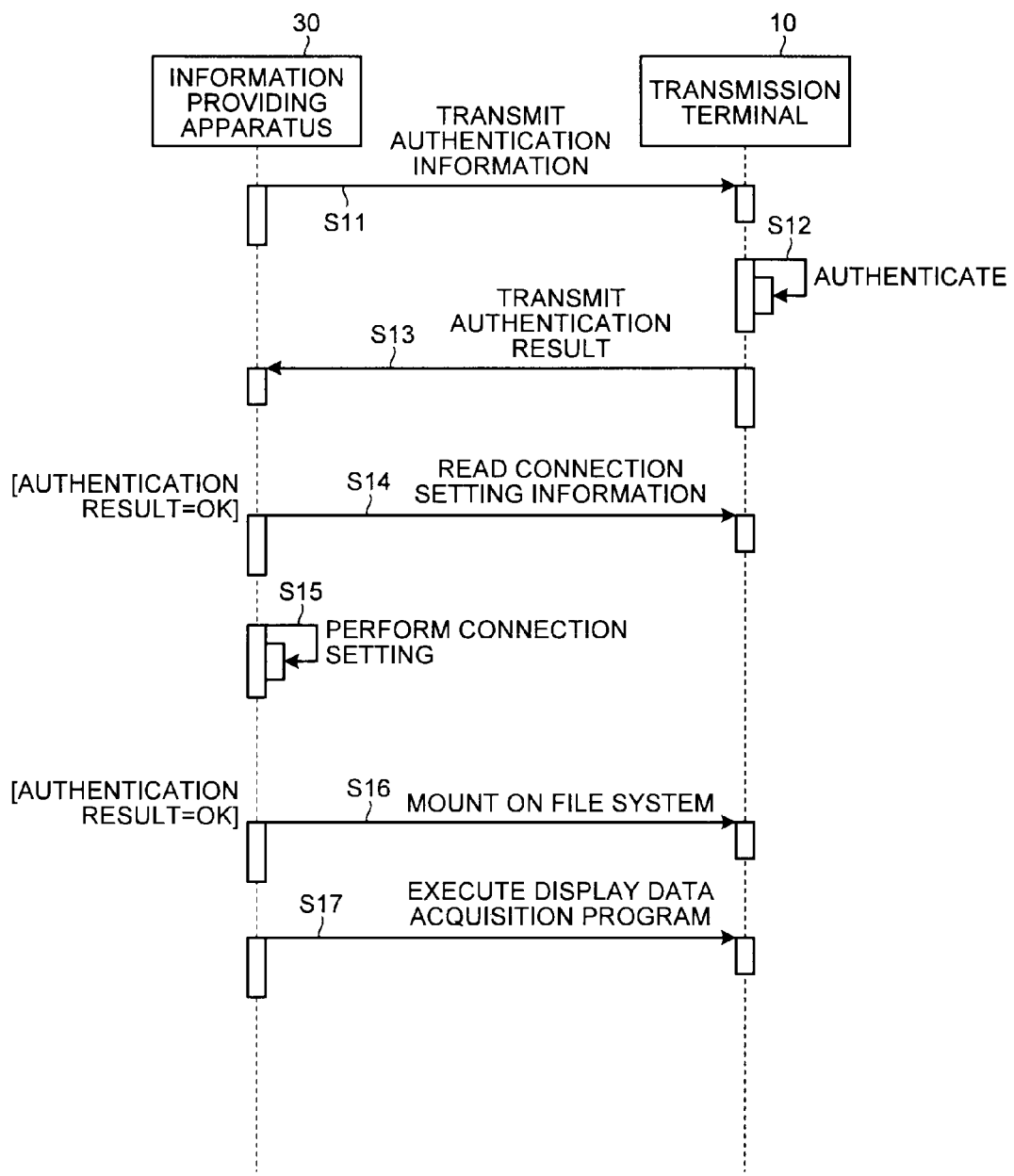
FIG. 13 is a diagram illustrating the process flow up to when a display data acquisition program of the transmission terminal is activated by the information providing apparatus.
Figure 14:
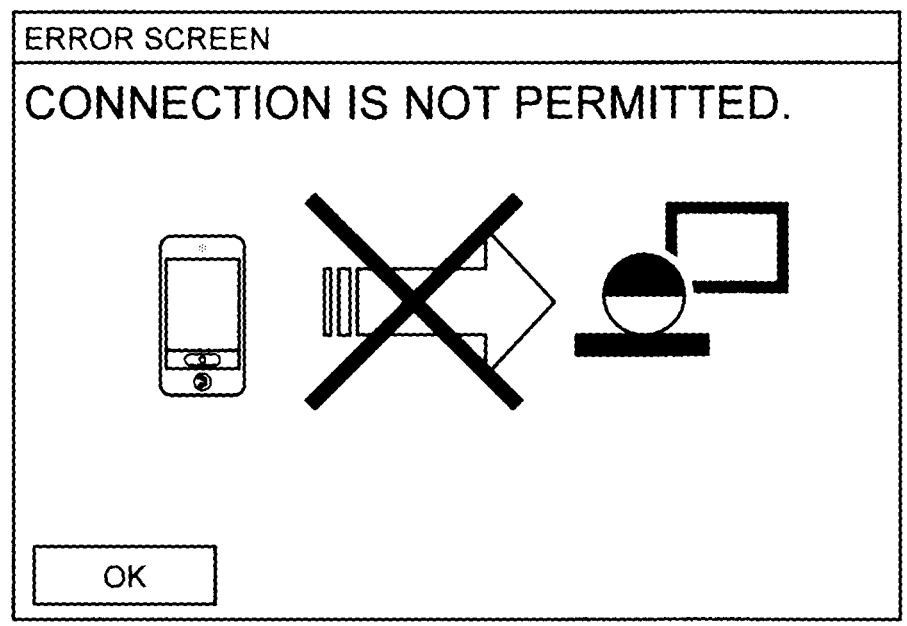
FIG. 14 is a diagram illustrating an example of an error screen displayed on the display of the information providing apparatus.

FIG. 13 is a diagram illustrating the process flow up to when the display data acquisition program 233 of the transmission terminal 10 is activated by the information providing apparatus 30. First, when an NFC communication is established between the information providing apparatus 30 and the transmission terminal 10, the NFC transceiver 31 of the information providing apparatus 30 transmits the authentication information described above received from the user by the operation input accepting unit 33 to the NFC transceiver 21 of the transmission terminal 10 (step S11).

On the other hand, in the transmission terminal 10, when the NFC transceiver 21 receives the authentication information, the external information determination unit 20 authenticates (validates) the authentication information received by the NFC transceiver 21 by referencing the authentication table 232 stored in the storage unit 23 (step S12). Specifically, the external information determination unit 20 of the transmission terminal 10 determines whether the user ID included in the authentication information received from the information providing apparatus 30 is present in the user ID column of the authentication table 232, and a password stored in a password column on the same row as the user ID column is identical to the password included in the authentication information. When it is determined that they are identical, the NFC transceiver 21 transmits an OK signal indicating that authentication is accepted from the NFC transceiver 21 of the transmission terminal 10 to the NFC transceiver 31 of the information providing apparatus 30 (step S13).

As the result of the authentication by the external information determination unit 20, when the user ID and password are not identical to those registered in the authentication table 232, the NFC transceiver 21 transmits an NG signal indicating that the authentication is rejected from the NFC transceiver 21 of the transmission terminal 10 to the NFC transceiver 31 of the information providing apparatus 30. In the information providing apparatus 30 having received the NG signal, the display control unit 34 displays an error screen illustrated in FIG. 14 and terminates the process.

When receiving the OK signal from the NFC transceiver 21 of the transmission terminal 10, the NFC transceiver 31 of the information providing apparatus 30 reads the connection setting information possessed by the NFC transceiver 21, namely the connection setting information of the second communication I/F 112 (the Bluetooth transceiver 22) necessary for Bluetooth communication (step S14).

Subsequently, the Bluetooth transceiver 32 of the information providing apparatus 30 performs connection setting for Bluetooth (registered trademark) communication using the connection setting information that the NFC transceiver 31 reads in step S14 (step S15). The Bluetooth transceiver 22 of the transmission terminal 10 initiates connection to the Bluetooth transceiver 32 in accordance with the connection setting and transmits an OK signal to the Bluetooth transceiver 32 when the connection succeeds. Moreover, when the connection fails, the Bluetooth transceiver 22 of the transmission terminal 10 transmits an NG signal to the Bluetooth transceiver 32.

In the information providing apparatus 30, when the Bluetooth transceiver 32 is determined to be in a state to be able to perform Bluetooth (registered trademark) communication, namely when the OK signal is received from the Bluetooth transceiver 22, the display data communication unit 36 accesses the storage unit 23 of the transmission terminal 10 through the Bluetooth transceiver 32 and the Bluetooth transceiver 22 and mounts the storage unit 23 on a file system of the information providing apparatus 30 (step S16). When the connection result from the Bluetooth transceiver 22 is the NG signal, the display control unit 34 of the information providing apparatus 30 displays the error screen illustrated in FIG. 14 and terminates the process.

When the mounting of the storage unit 23 is completed, the display data communication unit 36 of the information providing apparatus 30 accesses the file of the display data acquisition program 233 stored in the storage unit 23 to execute the display data acquisition program 233 (step S17). When the display data acquisition program 233 is executed, the function of the display data acquisition unit 35 is realized on the information providing apparatus 30, and the display data displayed by the display control unit 34 of the information providing apparatus 30 can be acquired.

In the above example, as illustrated in the login screen of FIG. 11, although the user of the information providing apparatus 30 manually inputs the authentication information, the user may not input the authentication information by storing the authentication information in advance in a storage medium that can be referenced by the NFC transceiver 31 at the stage of shipping the information providing apparatus 30. In this case, the flow may be modified in such a way that the processes associated with displaying of the login screen are not included.

As above, authentication is performed when connecting the information providing apparatus 30 and the transmission terminal 10 to each other, and the function of the display data acquisition unit 35 is not realized when the authentication is rejected. Thus, it is possible to prevent the display data from being carelessly transmitted to the transmission terminal 10 and to prevent leakage of information when the display data is confidential information. Moreover, when the information providing apparatus 30 and the transmission terminal 10 are connected with each other, the display data communication unit 36 of the information providing apparatus 30 mounts the storage unit 23 of the transmission terminal 10 to execute the display data acquisition program 233. Thus, it is not necessary to install the display data acquisition program 233 in the information providing apparatus 30 in advance, and it is possible to reduce the load of the user relating to preparation for a conference. Moreover, it is possible to save the capacity of the storage unit 38 of the information providing apparatus 30.

Figure 15A:
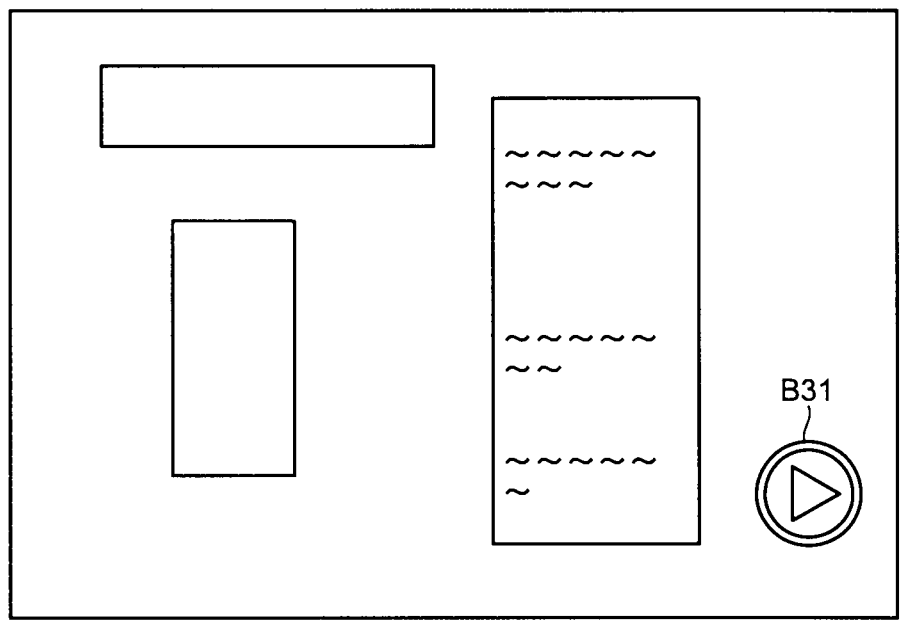
FIG. 15A is a diagram illustrating an example of a display screen displayed on the display of the information providing apparatus.
Figure 15B:
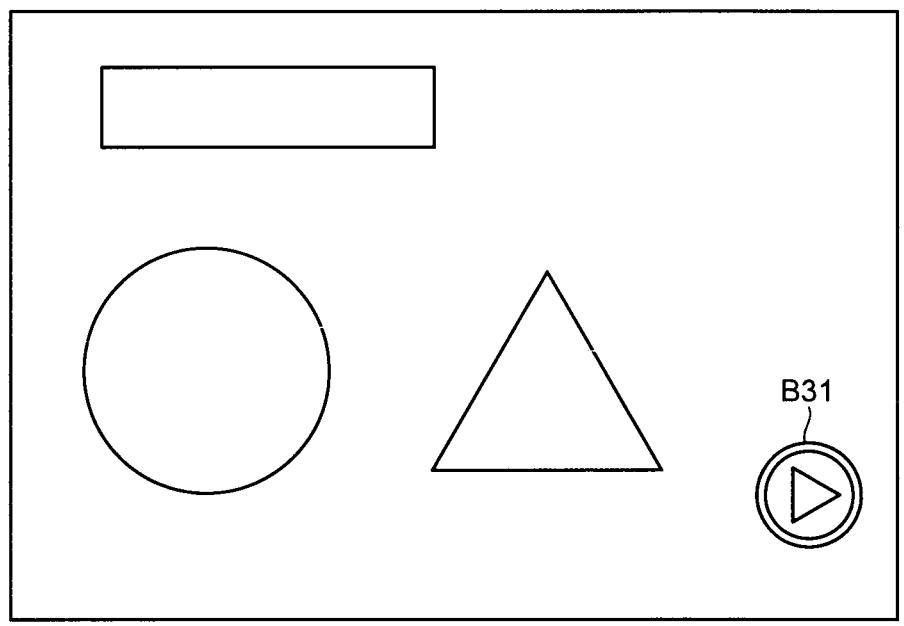
FIG. 15B is a diagram illustrating an example of a display screen displayed on the display of the information providing apparatus.

Next, the processes when transmitting the display data displayed on the information providing apparatus 30 to the transmission terminal 10 will be described with reference to FIGS. 15A, 15B and 16. The display data acquisition unit 35 of the information providing apparatus 30, which is realized in the information providing apparatus 30 by the execution of the display data acquisition program 233 displays a start button B31 on the display 306 as an operation input means for instructing to start transmitting the display data as illustrated in FIG. 15A or 15B. Here, FIGS. 15A and 15B are diagrams illustrating a display screen displayed on the display 306 of the information providing apparatus 30 and illustrated examples in which different display contents (display data) are displayed.

When detecting the pressing of the start button B31 through the operation input accepting unit 33, the display data acquisition unit 35 acquires the display data of a screen displayed on the display 306 and transmits the display data to the transmission terminal 10 using the display data communication unit 36. The start button B31 displayed on the display 306 is preferably not included in the display data. Hereinafter, the processes when the display data is transmitted from the information providing apparatus 30 will be described.

Figure 16:
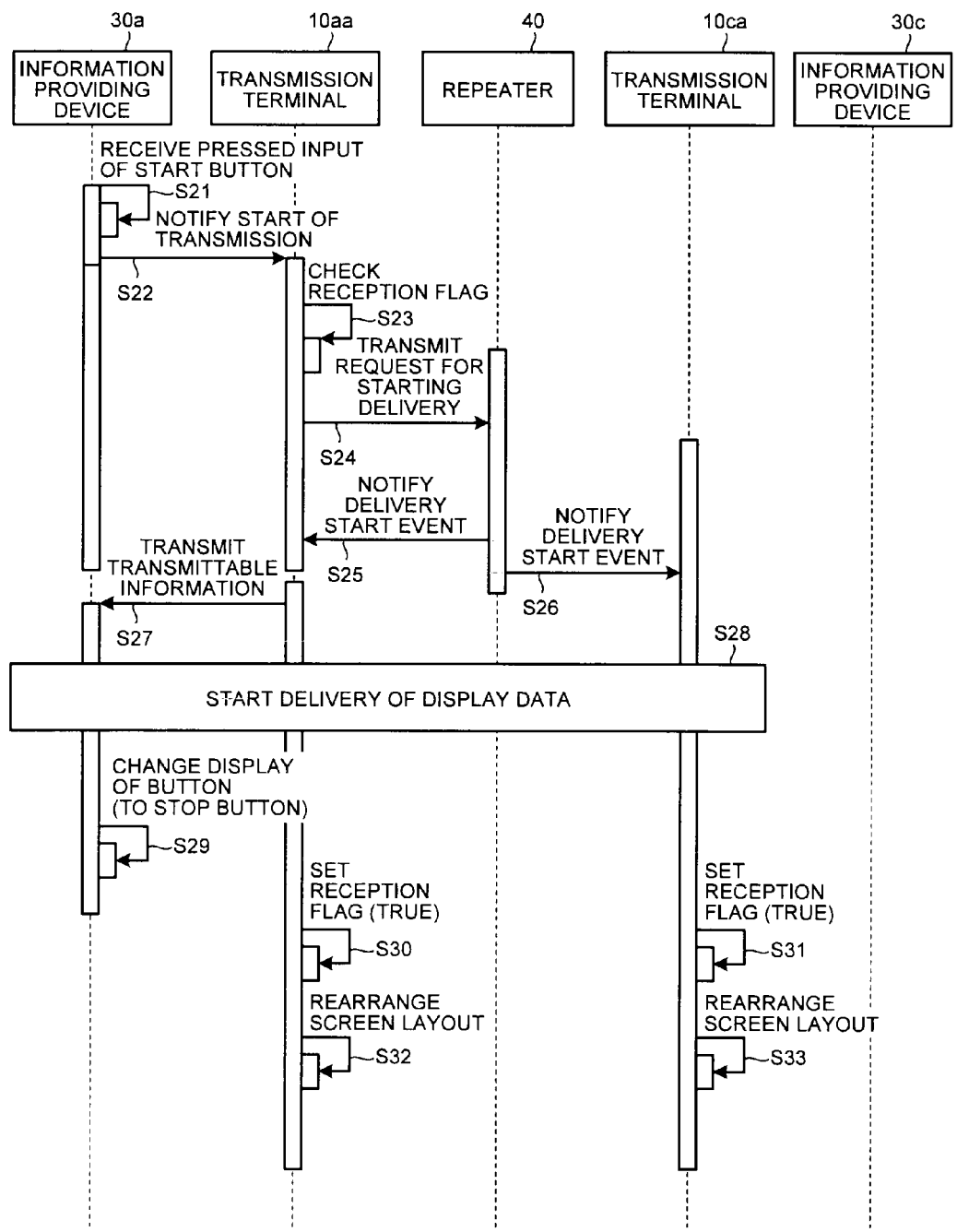
FIG. 16 is a diagram illustrating the process flow when display data is transmitted from the information providing apparatus.

FIG. 16 is a diagram illustrating the process flow when display data is transmitted from the information providing apparatus 30. Although two information providing apparatuses 30 (30a and 30c) and two transmission terminals 10 (10aa and 10ca) are illustrated in the drawing in order to simplify the description, the number of devices and terminals is not limited thereto, but may be three or more. Moreover, in this process, a case where the number of display data of the information providing apparatus 30 which can be displayed (shared) by the respective transmission terminals 10 is limited to one will be described. Furthermore, it is assumed that a Bluetooth communication is established between the information providing apparatus 30a and the transmission terminal 10aa, and between the information providing apparatus 30c and the transmission terminal 10ca.

Moreover, the external information determination unit 20 of each transmission terminal 10 stores, in the RAM 103 or the like, a reception flag for storing the reception state of the display data notified by the repeater 40. The reception flag stores information as to whether display data is currently being transmitted from the information providing apparatus 30, and stores "true (received)" or "false (not received)" depending on whether or not the display data is received. The initial value of the reception flag is "false."

Hereinafter, an example where display data is transmitted from the information providing apparatus 30a will be described. When the operation input accepting unit 33 of the information providing apparatus 30a receives the pressed input of a start button (the start button B31 or the like) instructing to start transmission of the display data (step S21), the display data acquisition unit 35 of the information providing apparatus 30a notifies the transmission terminal 10aa of starting the transmission of the display data (step S22).

In the transmission terminal 10aa having been informed of starting the delivery of the display data, the external information determination unit 20 checks the state of the reception flag (step S23), and if the external information determination unit 20 determines the state of the reception flag to be "false", the external information determination unit 20 transmits instruction information (hereinafter referred to as a delivery start request) requesting to start delivery of the display data to the repeater 40 (step S24).

In addition, it is assumed that one particular repeater 40 selected from among the repeaters 40 by the function of the selecting unit 18 is to be used as the repeater 40. Moreover, when transmitting information to the repeater 40, addresses such as the IP address or domain names specified from the terminal IDs of the other transmission terminals 10 registered in the management table 231 are transmitted together with the address of the subject transmission terminal 10 to thereby requesting the repeater 40 to transmit the same information to all transmission terminals 10 (including the subject transmission terminal 10) participating in the conference with the subject transmission terminal 10 (the same herein below).

Upon receiving the request for starting the delivery from the transmission terminal 10aa, the repeater 40 notifies a delivery start event informing the start of delivery of the display data to the transmission terminal 10aa having transmitted the request for starting the delivery and the other transmission terminals 10 being in communication with the transmission terminal 10aa (steps S25 and S26). Moreover, in the transmission terminal 10aa, when receiving the delivery start event from the repeater 40, the external information determination unit 20 transmits information (hereinafter referred to as transmittable information) instructing to start transmission of the display data to the information providing apparatus 30a (step S27).

In the information providing apparatus 30a, upon receiving the transmittable information from the transmission terminal 10aa, the display data communication unit 36 transmits the display data acquired by the display data acquisition unit 35 through the transmission terminal 10aa to the respective transmission terminals 10 (step S28). This transmission process will be described in detail below.

First, the display data acquisition unit 35 of the information providing apparatus 30a acquires a screen displayed on the display 306 as display data. Subsequently, the display data communication unit 36 transmits the display data acquired by the display data acquisition unit 35 to the transmission terminal 10aa through the Bluetooth transceiver 32.

In the transmission terminal 10aa connected to the information providing apparatus 30a by the Bluetooth communication, when receiving the display data from the information providing apparatus 30a, the external information determination unit 20 outputs, to the transceiver 11, the display data together with the data (captured image data or the like) acquired by the image capturing unit 14 and the sound input unit 15 of the subject transmission terminal 10aa to thereby transmit the data to the repeater 40 through the communication network 2.

Moreover, the repeater 40 transmits (delivers) the data transmitted from the transmission terminal 10aa to the respective transmission terminals 10. In this case, the display data of the information providing apparatus 30a, which is forwarded by the repeater 40, is also transmitted to the source transmission terminal 10aa. Moreover, the display control unit 17 of the transmission terminal 10aa displays data which has passed through the repeater 40 rather than displaying the data which has not been transmitted to the repeater 40. Similarly, the captured image data captured by the camera 113 of each transmission terminal 10 is set to be once transmitted to the repeater 40 and accordingly, the captured image data which has been returned from the repeater 40 is displayed.

With the above process, even when the display data is transmitted from any information providing apparatuses 30, the delay time up to when the display data is received by the respective transmission terminals 10 can be made nearly the same amount. Thus, for example, when the user of the information providing apparatus 30a turns one page (to display the next or previous page) of the document in the information providing apparatus 30a, because the contents displayed to the respective transmission terminals 10 are changed almost simultaneously, it is possible to promote smooth communication even in the teleconference. Moreover, similarly, as for the captured image data, the delay time up to when the captured image data is displayed to the respective transmission terminals 10 can be made nearly the same amount for all the transmission terminals 10.

Figure 17A:
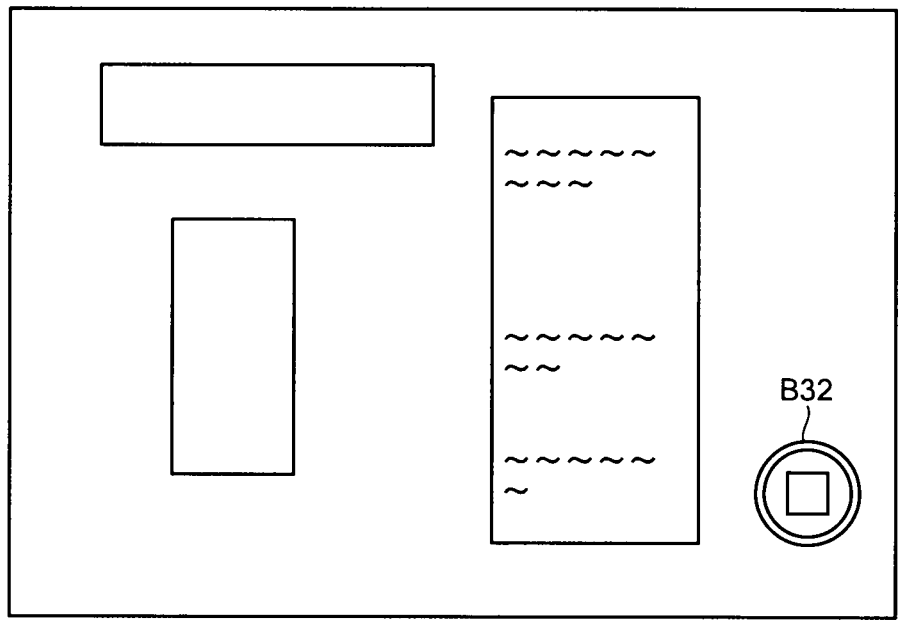
FIG. 17A is a diagram illustrating an example of a display screen displayed on the display of the information providing apparatus.
Figure 17B:
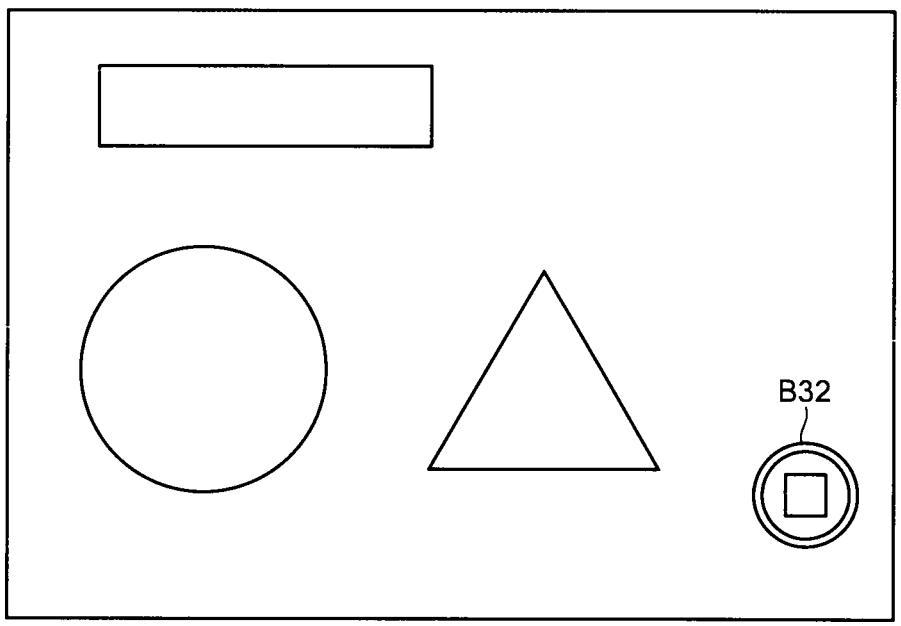
FIG. 17B is a diagram illustrating an example of a display screen displayed on the display of the information providing apparatus.

Now, let us return to the description of the processes in FIG. 16. In the information providing apparatus 30a, when the display data communication unit 36 starts transmitting the display data, the display data acquisition unit 35 changes the start button for instructing the start of delivery, displayed on the display 306, to a stop button for instructing to stop the delivery (step S29). Here, FIGS. 17A and 17B are diagrams illustrating the display screens displayed on the display 306 of the information providing apparatus 30 and correspond to the screens illustrated in FIGS. 15A and 15B. In FIGS. 17A and 17B, a stop button B32 is a button for instructing to stop the delivery of display data, which has been changed from the display of the start button B31 illustrated in FIGS. 15A and 15B in response to the transmission of display data. As will be described later, the transmission of display data is stopped when the stop button B32 is pressed.

Returning to FIG. 16, in the respective transmission terminals 10 having received the display data, the external information determination unit 20 sets the reception flag to "true" (steps S30 and S31), and the display control unit 17 rearranges the screen layout of the display data and the captured image data (steps S32 and S33). Specifically, as described in FIG. 9, the display data transmitted from the information providing apparatus 30a is arranged and displayed in the display region A21, and the captured image data captured by the respective transmission terminals 10 are arranged and displayed sequentially in the display regions starting with the display region A22.

As described above, by arranging (displaying) the start button for instructing to start transmission of the display data on the display 306 of the information providing apparatus 30, the user can transmit (deliver) the display data to the respective transmission terminals 10 with a simple operation of pressing the start button. Moreover, since it is possible to easily check whether or not the display data is delivered by switching between the start button and the stop button in accordance with the transmission status of the display data, it is possible to prevent an erroneous operation to erroneously transmit information whose revelation is undesirable to the user.

Next, an example of a process to switch from a transmission of the display data of the information providing apparatus 30a to a transmission of the display data of the information providing apparatus 30c will be described with reference to FIG. 18. Here, FIG. 18 is a diagram illustrating the process flow when a transmission source of the display data is changed. In addition, the processes illustrated in FIG. 18 illustrates an example when the start button B31 of the information providing apparatus 30c is pressed after the processes of FIG. 16 are performed.

In the operation input accepting unit 33 of the information providing apparatus 30c, when accepting the input by pressing the start button B31 from the user (step S41), the display data acquisition unit 35 of the information providing apparatus 30c notifies the transmission terminal 10ca of the start of delivery of the display data (step S42).

In the transmission terminal 10ca having been notified of the start of delivery of the display data, the external information determination unit 20 checks the status of the reception flag (step S43) and transmits instruction information (hereinafter referred to as delivery stop request) requesting the repeater 40 to stop delivering the display data when the status is determined to be "true" (step S44).

When receiving the delivery stop request from the transmission terminal 10ca, the repeater 40 transmits a delivery stop event informing the stop of delivery of the display data to the transmission terminal 10ca having transmitted the delivery stop request and the other transmission terminals 10 being in communication with the transmission terminal 10ca (steps S45 and S46).

The external information determination unit 20 of each transmission terminal 10 having received the delivery stop event transmits information (hereinafter referred to as transmission stop information) instructing to stop delivery of display data to the information providing apparatus 30 connected to the subject transmission terminal 10 (steps S47 and S48). The display data acquisition unit 35 of the information providing apparatus 30a which is transmitting the display data stops transmission of the display data in response to the transmission stop information, thereby to stop delivery of the display data to the respective transmission terminals 10 by the repeater 40 (step S49).

Moreover, when receiving the transmission stop information, the display data acquisition unit 35 of each information providing apparatus 30 changes the display of the stop button B32 being displayed on the display 306 to the start button B31 for instructing the start of transmission of the display data (steps S50 and S51). With this processing, the stop button B32 of the information providing apparatus 30a illustrated in FIG. 17A is changed to the start button B31 as illustrated in FIG. 15A. Although the change in the display is similarly performed in the information providing apparatus 30c, because the start button B31 is already displayed, the appearance as viewed from the user of the information providing apparatus 30c is not changed.

Subsequently, when the external information determination unit 20 of each transmission terminal 10 sets the reception flag to "false" (steps S52 and S53), the display control unit 17 clears the display data being displayed in the display region A21 of the display 306 and sequentially arranges and displays the captured image data of the respective transmission terminals 10 in the display regions starting with the display region A21, thereby to rearrange the display screen (steps S54 and S55). Moreover, the external information determination unit 20 of the transmission terminal 10ca transmits a delivery start request to the repeater 40 (step S56). In the subsequent steps S57 to S65, the same processes as the steps S25 to S33 described in FIG. 16 are performed, and redundant description thereof is not provided.

In this way, the display data of the information providing apparatus 30c is arranged in the display region A21 of the display screen of each transmission terminal 10 and the other image data are sequentially arranged in the display regions starting with the display region A22. Moreover, even when the display data of another location is displayed on the screen of the transmission terminal 10, the user at the subject location can transmit the display data displayed to the information providing apparatus 30 at the subject location to the transmission terminals 10 at the respective locations to change the screen with the display data of the subject location by a simple operation of pressing the start button of the information providing apparatus 30.

Figure 19:
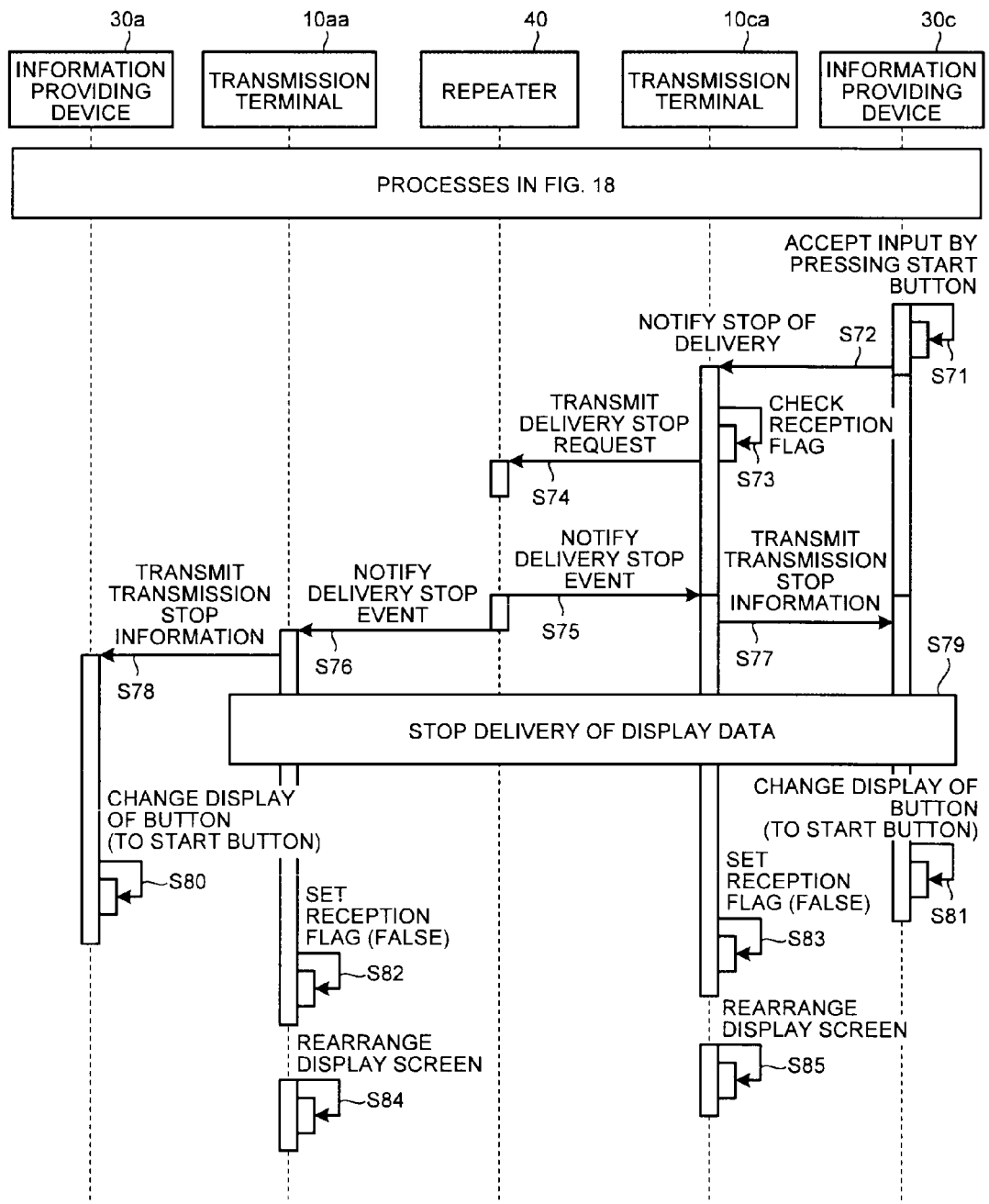
FIG. 19 is a diagram illustrating the process flow when transmission of display data is halted.

Next, an example of a process to stop the display data being transmitted from the information providing apparatus 30 will be described with reference to FIG. 19. Here, FIG. 19 is a diagram illustrating the process flow to stop the transmission of display data. The processes illustrated in FIG. 19 illustrates an example when the stop button B32 of the information providing apparatus 30c is pressed after the processes of FIG. 18 are performed.

In the operation input accepting unit 33 of the information providing apparatus 30c, when accepting the input by pressing the stop button B32 from the user (step S71), the display data acquisition unit 35 of the information providing apparatus 30c informs the transmission terminal 10ca of the stop of delivery of the display data (step S72). The subsequent steps S73 to S85 are the same as the steps S43 to S55 described in FIG. 18, and redundant description thereof is not provided.

In this way, the transmission of the display data from the information providing apparatus 30c is stopped, and only the image data is displayed on the display screen of the respective transmission terminals 10. In addition, the image data of the location where a conversation is being held as described above is arranged in the display region A21 within the display screen of each transmission terminal 10. As above, the user of the information providing apparatus 30 can stop transmission of the display data with a simple operation of pressing the stop button B32.

According to the processes illustrated in FIGS. 16, 18, and 19, when sharing the display screen (display data) of the information providing apparatus 30 with the respective transmission terminals 10, the user can bring the information providing apparatus 30 in proximity to a desired transmission terminal 10, thereby to deliver the display data, through the transmission terminal 10, to the other transmission terminals 10. Thus, it is not necessary to follow a network connection procedure at each conference location, and the display data can be shared easily. Moreover, because it is not necessary to prepare other network-based techniques in order to realize screen sharing, it is possible to prevent an increase in cost.

Moreover, because the respective transmission terminals 10 are allowed to transmit a delivery start request or a delivery stop request to the repeater 40, the repeater 40 does not need to manage which transmission terminal 10 (information providing apparatus 30) is in the status of transmitting the display data. In this way, although it is necessary to limit the display data transmitted from the information providing apparatus 30 to one location, the processing load of the repeater 40 decreases, and the display data can be relayed to a larger number of transmission terminals 10, and accordingly, it is possible to improve the scalability.

In addition, the graphical user interface (GUI) for instructing the start or stop of transmission displayed to the respective information providing apparatuses 30 is not limited to the button (the start button B31 and the stop button B32), and a menu may be displayed so as to allow the user to make a selection. Moreover, labels (for example, "start screen sharing" for the start button B31 and "stop screen sharing" for the stop button B32) may be allocated to the start button B31 and the stop button B32, respectively, so that the content of processing occurring when the button is pressed is displayed. Moreover, text data like "screen sharing is available" and "screen is being shared" may be displayed together with the start button B31 and the stop button B32, respectively.

While the embodiment according to the present invention has been described, the present invention is not limited thereto, but various changes, substitutions, additions, and the like can be made within the range without departing from the spirit of the present invention.

For example, in the above embodiment, although an example of teleconference between locations separated in distance has been described, the present invention is not limited thereto. The present invention may be used not only in a teleconference between locations actually separated in distance but also in a teleconference between meeting rooms close in distance like meeting rooms in the same building and a teleconference between locations in the same room where a person's voice is not easily heard by the other person. That is, the teleconference does not mean a direct face-to-face conference but means a conference which is held through a transmission system. Moreover, the conference is intended to include a meeting which is made between two persons.

Moreover, in the above embodiment, although a case where the videoconference is performed by the transmission system 1 has been described, the present invention is not limited thereto, but the invention may be used in a meeting, a casual conversation between family members or friends, or one-way presentation of information.

According to the present invention, when sharing the display screen (display data) of an information providing apparatus with respective transmission terminals, it is possible to deliver the display data to another transmission terminal through a desired transmission terminal by bringing the desired transmission terminal in proximity to the information providing apparatus. Thus, it is possible to share the display data easily.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A transmission terminal comprising:
a network communication transceiver configured to transceive predetermined data including image data with another transmission terminal connected to a communication network;
a first radio communication transceiver and a second radio communication transceiver, wherein the transmission terminal establishes a radio communication with an information providing apparatus by using the first radio communication transceiver and the second radio communication transceiver;
the first radio communication transceiver being configured to establish a proximity communication with the information providing apparatus in response to an approach of the information providing apparatus that displays a predetermined image and to transmit connection setting information required to establish a communication by the second radio communication transceiver, which is capable of performing communication at a longer range than the first radio communication transceiver;
the second radio communication transceiver being configured to establish a radio communication with the information providing apparatus by using the connection setting information, wherein the communication established via the first radio communication transceiver and the communication established via the second radio communication transceiver is external to the communication network through which the transmission terminal is connected to the another transmission terminal;
a display data receiver configured to receive display data representing a screen being displayed by the information providing apparatus through a communication path established by the second radio communication transceiver after the second radio communication transceiver establishes the radio communication with the information providing apparatus based on the connection setting information; and
a display data transmitter configured to transmit the display data received by the display data receiver to the other transmission terminal using the network communication transceiver, such that the display data representing the screen being displayed by the information providing apparatus is provided to the another transmission terminal, in combination with the image data, via the communication path established by the second radio communication transceiver of the transmission terminal.

2. The transmission terminal according to claim 1, further comprising
a memory configured to provide a storage area to which the information providing apparatus can access through the communication path established by the second radio communication transceiver and to store, in the storage area, a display data acquisition program for implementing a function of acquiring the display data in the information providing apparatus.

3. The transmission terminal according to claim 1, further comprising:
circuitry configured to control display of the image data and/or the display data on a display device,
wherein the display data transmitter transmits display data received by the display data receiver and/or image data in the transmission terminal to a repeater that relays the display data and/or the image data to all the transmission terminals connected to the communication network, and
wherein the circuitry causes the display device to display the display data and the image data transmitted from the repeater.

4. The transmission terminal according to claim 1, further comprising:
circuitry configured to control display of the image data and/or the display data on a display device,
the circuitry being configured to determine whether the display data is being received from the repeater,
wherein the circuitry changes a layout of the display data or the image data displayed on the display device in accordance with the result of the determination.

5. The transmission terminal according to claim 4,
wherein when the circuitry determines that the display data is being received, the circuitry controls display of the display data in a first display region included in a screen of the display device and controls display of the image data in a second display region included in the same screen and different from the first display region.

6. The transmission terminal according to claim 5,
the circuitry being configured to stop the reception of the display data from the information providing apparatus when the circuitry determines that the display data transmitted from another transmission terminal is being received,
wherein the circuitry controls display of the display data transmitted from the other transmission terminal in the first display region.

7. The transmission terminal according to claim 5,
wherein when the circuitry determines that the display data is not being received, the circuitry controls display of, based on terminal information received by the network communication transceiver for distinguishing a specific transmission terminal, the image data transmitted from a transmission terminal corresponding to the terminal information in the first display region and the image data transmitted from a transmission terminal other than the transmission terminal corresponding to the terminal information in the second display region.

8. The transmission terminal according to claim 5,
wherein the first display region is arranged at a position close to center of a display screen as compared to an arrangement position of the second display region.

9. The transmission terminal according to claim 7,
wherein the first display region is arranged at a position close to center of a display screen as compared to an arrangement position of the second display region.

10. The transmission terminal according to claim 4,
wherein when the circuitry determines that the display data is being received, the circuitry displays the display data in a first screen of the display device and displays the image data in a second screen different from the first screen.

11. The transmission terminal according to claim 10,
the circuitry being configured to stop the reception of the display data from the information providing apparatus when the circuitry determines that the display data transmitted from another transmission terminal is being received,
wherein the circuitry controls display of the display data transmitted from the other transmission terminal in the first screen.

12. The transmission terminal according to claim 11,
wherein when the circuitry determines that the display data is not being received, the circuitry does not cause display the first screen but controls display of the image data transmitted from a transmission terminal corresponding to terminal information for distinguishing a specific transmission terminal, received by the network communication transceiver in a first display region of the second screen and displays the image data transmitted from a transmission terminal other than the transmission terminal corresponding to the terminal information in a second display region that is different from the first display region of the second screen based on the terminal information.

13. The transmission terminal according to claim 12,
wherein the first display region of the second screen is arranged at a position close to center of the display screen as compared to an arrangement position of the second display region.

14. The transmission terminal according to claim 10, further comprising
an operation input acceptor configured to receive an operation input from a user,
wherein the circuitry alternately controls changing the displays of the first and second screens when a predetermined operation input is received through the operation input acceptor.

15. The transmission terminal according to claim 1,
wherein, prior to providing the connection setting information, the first radio communication transceiver receives authentication information from the information providing apparatus and transmits an authentication result obtained from the authentication information and an authentication result of a predetermined authorized user, to the information providing apparatus.

16. A method of transmitting display data, implemented by a transmission terminal having a first radio communication transceiver and a second radio communication transceiver, wherein the transmission terminal establishes a radio communication with an information providing apparatus by using the first radio communication transceiver and the second communication radio transceiver, the method comprising:
transceiving, by a network communication transceiver, predetermined data including image data between the transmission terminal and another transmission terminal connected to a communication network;
establishing, by the first radio communication transceiver, a proximity communication with the information providing apparatus in response to an approach of the information providing apparatus that displays a predetermined image and transmitting connection setting information required to establish a communication by the second radio communication unit, which is capable of performing communication at a longer range the first radio communication transceiver;
establishing, by the second radio communication transceiver, a radio communication with the information providing apparatus by using the connection setting information, wherein the communication established via the first radio communication transceiver and the communication established via the second radio communication transeiver is external to the communication network through which the transmission terminal is connected to the another transmission terminal;

receiving, by a display data receiver, display data representing a screen being displayed by the information providing apparatus through a communication path established by the second radio communication transceiver after the second radio communication transceiver establishes the radio communication with the information providing apparatus based on the connection setting information; and transmitting, by a display data transmitter, the display data received by the receiving of the display data to the other transmission terminal using the network communication transceiver such that the display data representing the screen being displayed by the information providing apparatus is provided to the another transmission terminal, in combination with the image data, via the communication path established by the second radio communication transceiver of the transmission terminal.

17. A non-transitory computer readable medium, that stores computer executable instructions, which when executed by a transmission terminal, cause the transmission terminal to perform a method of transmitting display data, the transmission terminal having a first radio communication transceiver and a second radio communication transceiver, wherein the transmission terminal establishes a radio communication with an information providing apparatus by using the first radio communication transceiver and the second communication radio transceiver, the method comprising:

transceiving, by a network communication transceiver, predetermined data including image data between the transmission terminal and another transmission terminal connected to a communication network;

establishing, by the first radio communication transceiver, a proximity communication with the information providing apparatus in response to an approach of the information providing apparatus that displays a predetermined image and transmitting connection setting information required to establish a communication by the second radio communication unit, which is capable of performing communication at a longer range the first radio communication transceiver;

establishing, by the second radio communication transceiver, a radio communication with the information providing apparatus by using the connection setting information, wherein the communication established via the first radio communication transceiver and the communication established via the second radio communication transceiver is external to the communication network through which the transmission terminal is connected to the another transmission terminal;

receiving, by a display data receiver, display data representing a screen being displayed by the information providing apparatus through a communication path established by the second radio communication transceiver after the second radio communication transceiver establishes the radio communication with the information providing apparatus based on the connection setting information; and transmitting, by a display data transmitter, the display data received by the receiving of the display data to the other transmission terminal using the network communication transceiver such that the display data representing the screen being displayed by the information providing apparatus is provided to the another transmission terminal, in combination with the image data, via the communication path established by the second radio communication transceiver of the transmission terminal.

18. The method of transmitting display data according to claim 16, further comprising:
controlling display, by circuitry, of the image data and/or the display data on a display device.

19. The non-transitory computer readable medium according to claim 17, the method further comprising:
controlling display, by circuitry, of the image data and/or the display data on a display device.

20. The transmission terminal according to claim 1, wherein the display data transmitter is configured to transmit the display data received by the display data receiver to the other transmission terminal, to be displayed on a display connected to the other transmission terminal as part of a videoconference, using the network communication transceiver.

* * * * *